US006527393B1

(12) United States Patent
Ogawa

(10) Patent No.: US 6,527,393 B1
(45) Date of Patent: Mar. 4, 2003

(54) ILLUMINATION OPTICAL SYSTEM AND PROJECTOR USING SAME

(75) Inventor: Yasunori Ogawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 09/620,556

(22) Filed: Jul. 20, 2000

(30) Foreign Application Priority Data

Jul. 28, 1999 (JP) .......................................... 11-213347
Jul. 28, 1999 (JP) .......................................... 11-213358

(51) Int. Cl.$^7$ ............................................. G03B 21/14
(52) U.S. Cl. ..................................................... 353/38
(58) Field of Search .............................. 353/20, 38, 31, 353/34, 37, 102

(56) References Cited

U.S. PATENT DOCUMENTS 5,662,401 A * 9/1997 Shimizu et al. ................ 353/38
6,062,695 A * 5/2000 Kakuda et al. ................ 353/38
6,067,193 A * 5/2000 Sekine et al. .................. 353/20
6,092,901 A * 7/2000 Hashizume et al. .......... 353/20
6,257,726 B1 * 7/2001 Okuyama et al. ............. 353/20
6,273,569 B1 * 8/2001 Iechika et al. ................. 353/38

* cited by examiner

Primary Examiner—William Dowling
(74) Attorney, Agent, or Firm—Oblon, Spivak, McClelland, Maier & Neustadt, P.C.

(57) ABSTRACT

The illumination system comprises a light source; a first lens array of small lenses for dividing light from the light source into a plurality of light beams; and a second lens array of small lenses corresponding to the small lenses of the first lens array. The second lens array is located near where the plurality of light beams from the first lens array are converged. Each small lens of the second lens array has an outer shape of a non-rectangular polygon which is related to a profile of the light converged by a corresponding small lens of the first lens array. The second lens array may have a flat portion provided between the columns of the small lenses.

49 Claims, 22 Drawing Sheets

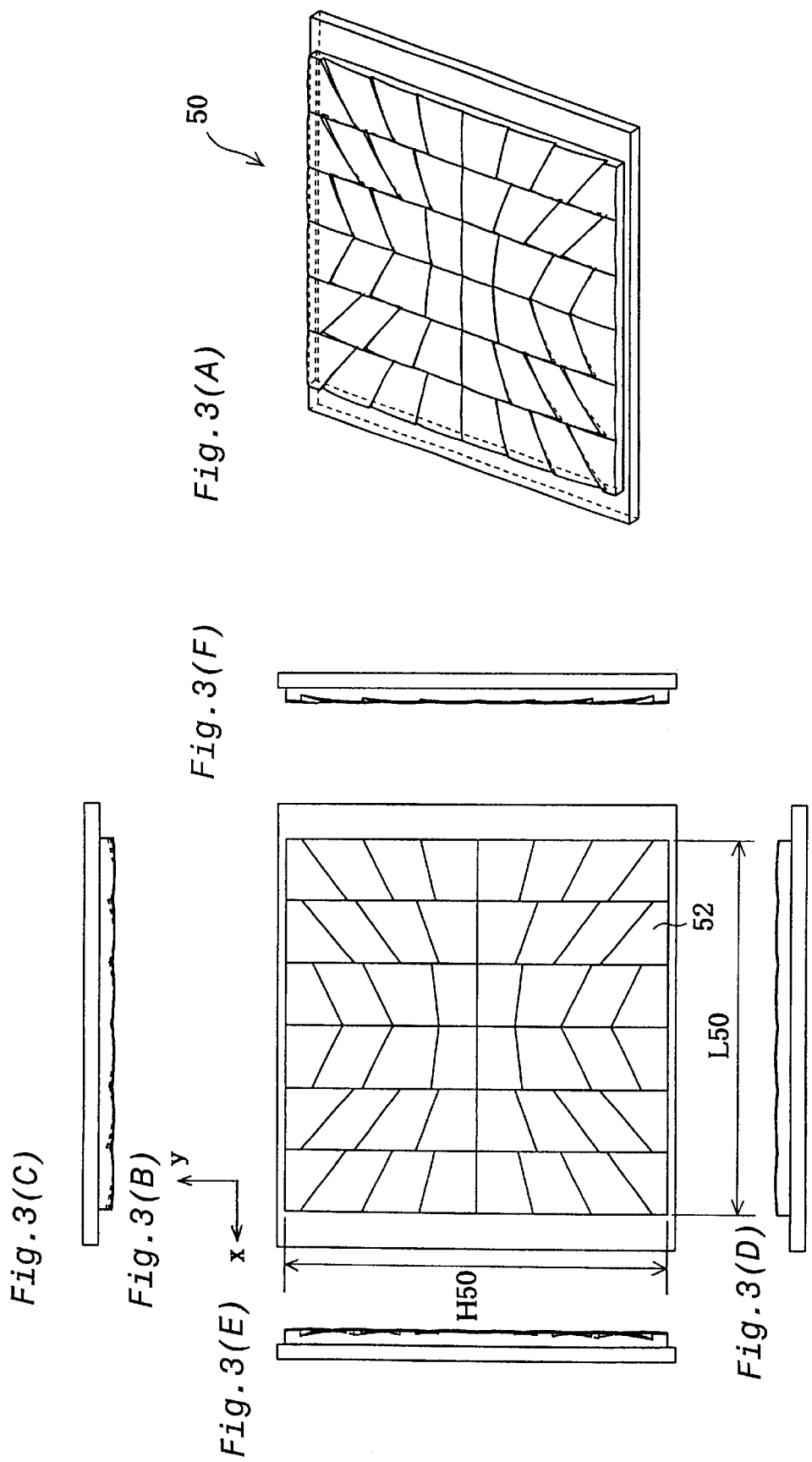

100ax

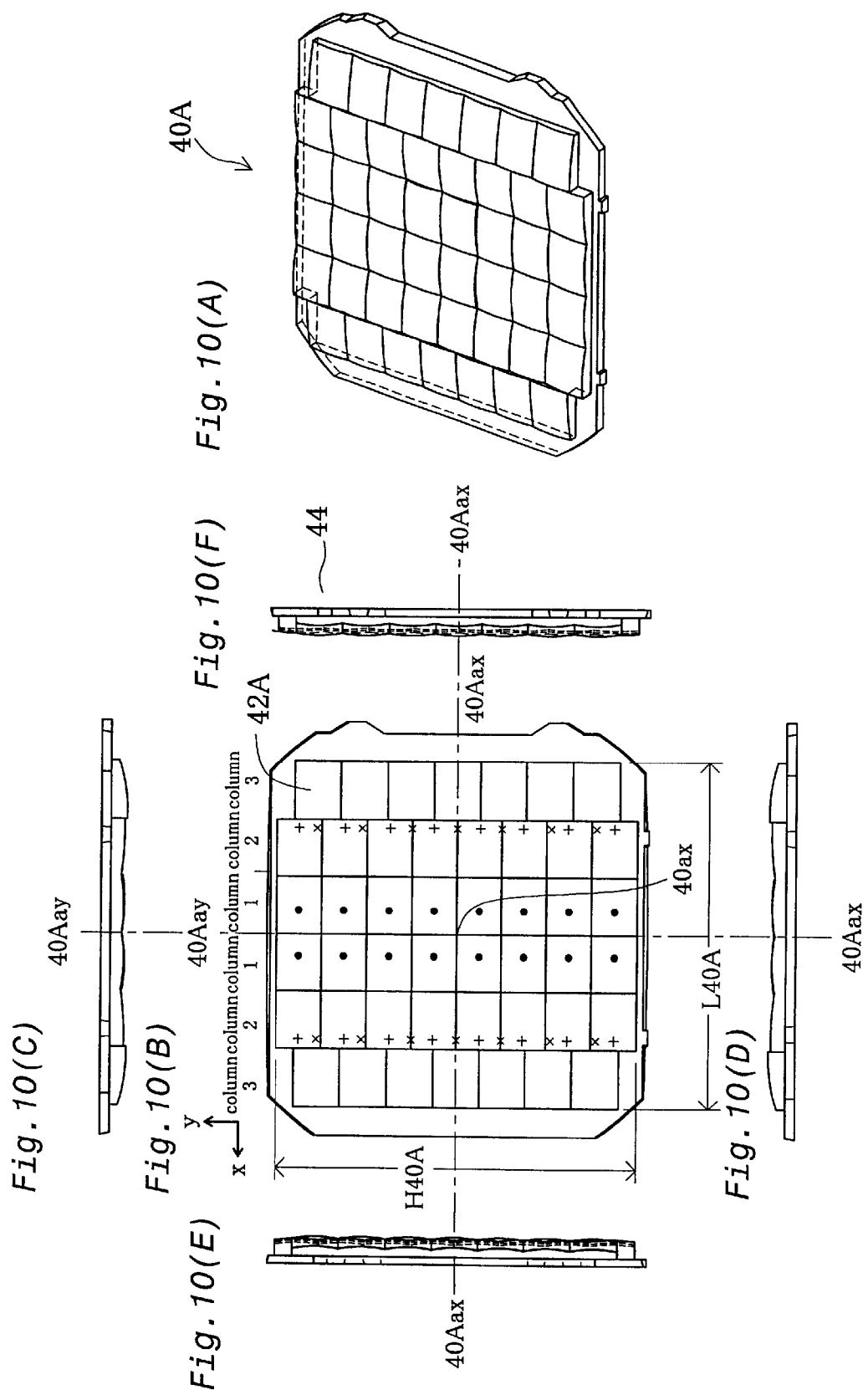

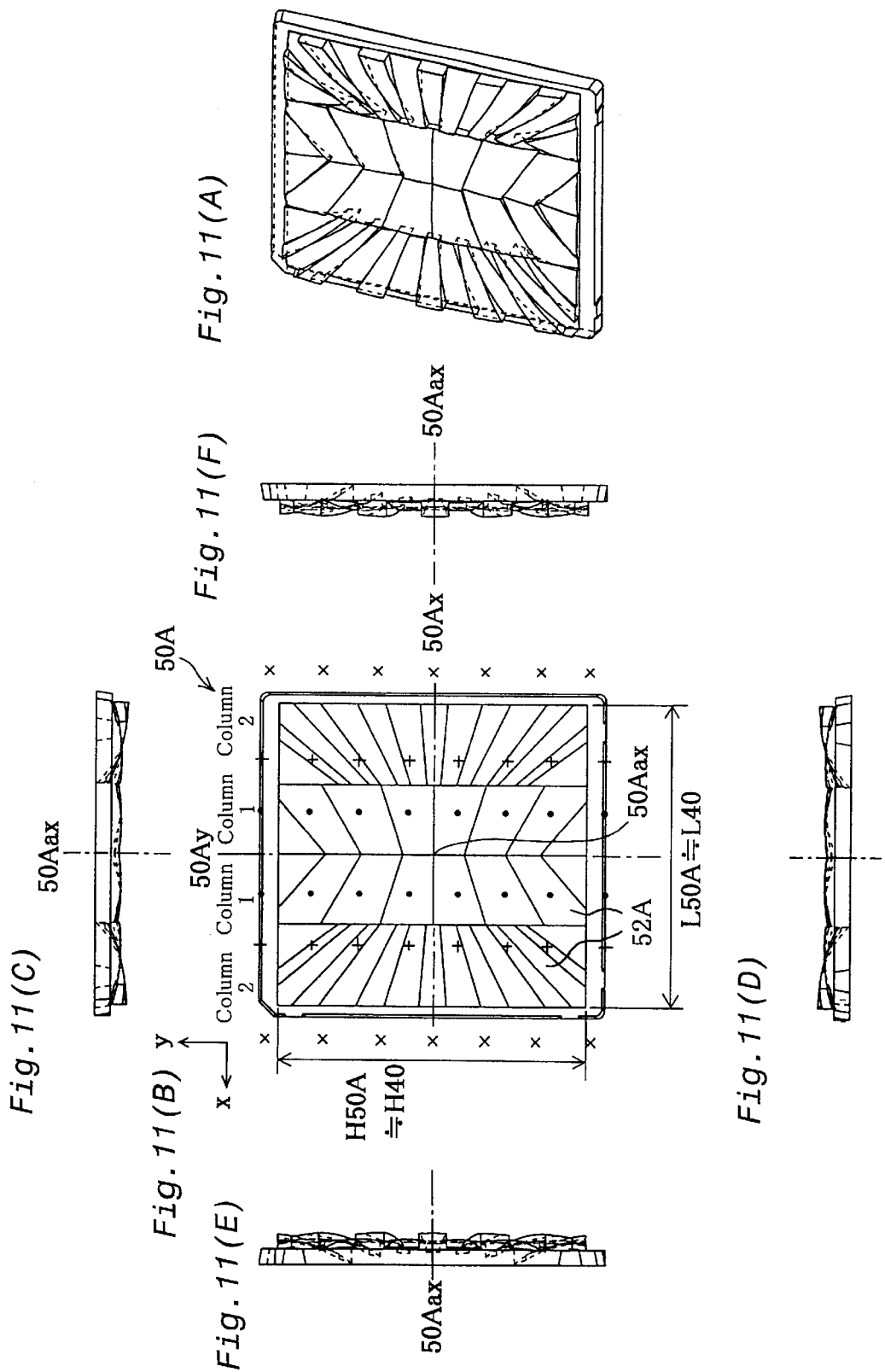

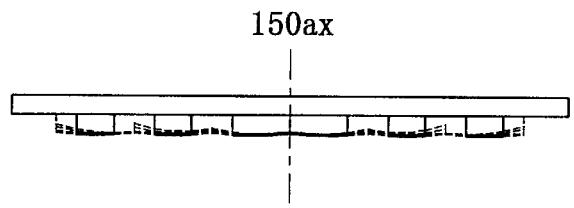
Fig.19(B)
Fig.19(A)
Fig.19(C)
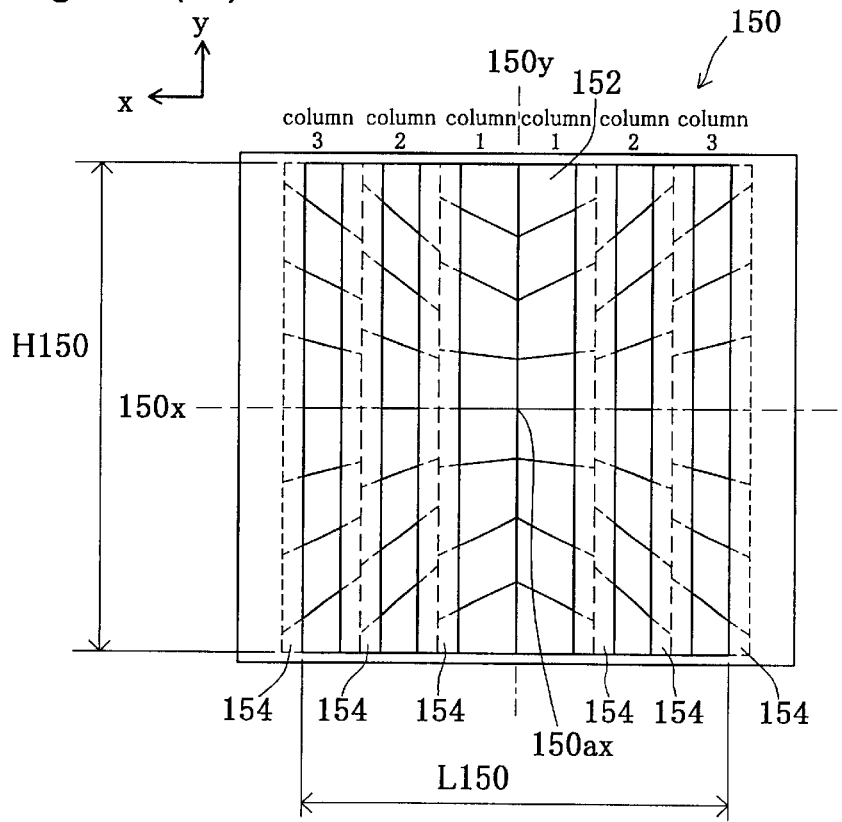
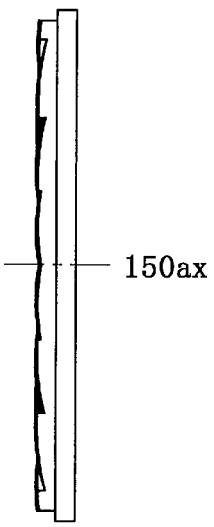

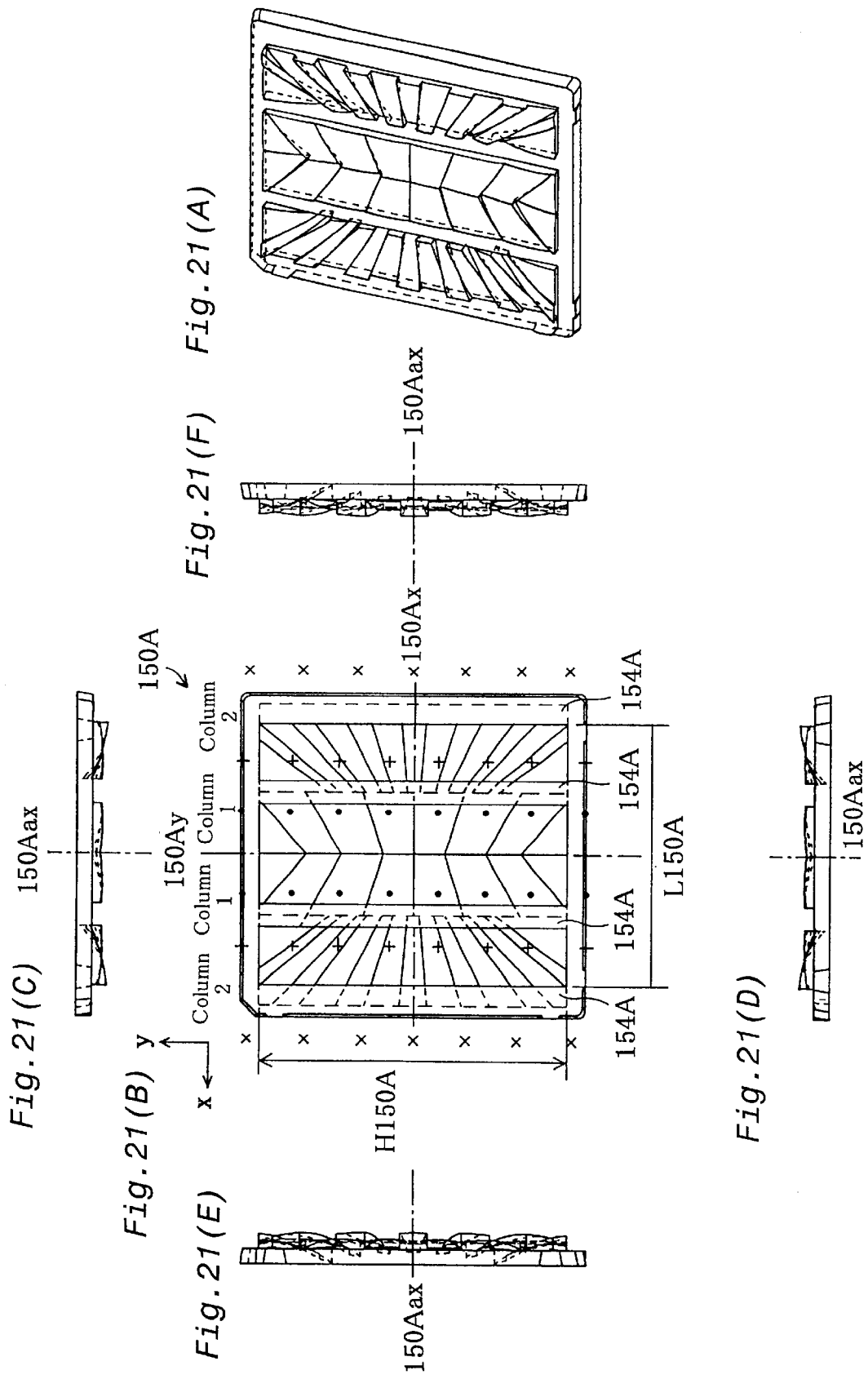

ILLUMINATION OPTICAL SYSTEM AND PROJECTOR USING SAME

BACKGROUND OF THE INVENTION

1. Field of the Invention

This invention relates to an illumination optical system that splits light from a light source into multiple light beams, and superimposes the multiple light beams on a common illumination area. The invention also relates to a projector which comprises the illumination optical system and which can project images on a screen with a uniform brightness.

2. Description of the Related Art

In a projector, illumination light from an illumination optical system is projected onto light modulators called light valves. The light valves modulate the light in accordance with the image information to be displayed, and the modulated light is projected onto a screen to display the images.

A projector should display the images at a uniform brightness. Generally, however, the intensity of the light is at its highest near the axis of the light source, and declines as the distance from the axis increases. If this light is used without modification as the illumination light, the brightness of the projected images will be uneven. To resolve this problem, in the prior art integrator optical systems are used to ensure uniform illumination of the light modulators comprising the illumination area.

Generally, an integrator optical system splits the light from the light source into multiple light beams, which are then superimposed on the illumination area to achieve uniformity of the illumination.

The ideal light source for an illumination optical system is a point light source, but this is difficult to achieve. In the process of splitting the source light into multiple light beams and superimposing the beams onto the illumination area, an integrator optical system may degrade the efficiency with which light from the light source is utilized.

Images displayed by a projector should be as bright as possible. To achieve this high brightness, ideally the illumination optical system used is one that maximizes the light utilization efficiency.

There is another problem about an integrator optical system that it is difficult to manufacture an array of small lenses of the beam-splitting optical system included in the integrator system with good precision.

SUMMARY OF THE INVENTION

Accordingly an object of the invention is to increase light utilization efficiency in an illumination optical system. Another object is to provide a technology that enables the lens array of the beam-splitting optical system to be readily manufactured. Still another object is to provide a projector that enables brighter, more uniform projection images.

In order to attain at least part of the above and other related objects of the present invention, there is provided an illumination system. The illumination system comprises: a light source; a first lens array of small lenses for dividing light from the light source into a plurality of light beams; and a second lens array of small lenses corresponding to the small lenses of the first lens array. The second lens array is located near where the plurality of light beams from the first lens array are converged. Each small lens of the second lens array has an outer shape of a non-rectangular polygon which is related to a profile of the light converged by a corresponding small lens of the first lens array.

Each of the multiple light beams emanating from the small lenses of the first lens array has to fall incident on the associated lens of the second lens array to enable the light to be used effectively for illumination.

The second lens array is comprised of small lenses that are polygonal in shape but not truly rectangular or square, so that they correspond to the shape of the multiple light beams converged by the small lenses of the first lens array. This makes it possible to prevent the multiple beams exiting the small lenses of the first lens array from impinging on small lenses of the second lens array located adjacent to the target small lens. This improves the illumination light utilization efficiency.

According to another aspect of the invention, the second lens array has a flat portion provided between the columns of the small lenses. In this case the second lens array may not have an outer shape of a non-rectangular polygon related to a profile of the light converged by a corresponding small lens of the first lens array.

Since the columns of small lenses of the second lens array are separated by the flat portion, these small lens columns are not in direct mutual contact. Thus the second lens array can be manufactured with good precision more easily than a lens array in which all small lenses are in direct contact with each other.

In the above illumination system, when two reference axes perpendicular to each other are defined to pass through a center of the second lens array, at least some segmentation lines used to segment the second lens array into the plurality of small lenses may have an angle of inclination to the reference axes such that the angle of the inclination increases with an increase in distance from the reference axes.

This configuration enables the small lenses of the second lens array to be shaped to match the inclined profile of the multiple light beams.

The present invention is also directed to a projector comprises: an illumination system having the above configuration; a light modulator that modulates incident light from the illumination system in accordance with image information; and a projection optical system that projects the modulated light.

Since the illumination system of the invention has an integrator optical system including first and second lens arrays, it is possible to obtain light of uniform brightness and color even if there is a major bias in the sectional intensity distribution of the light emitted by the light source. Therefore, it is possible to obtain projection images that exhibit uniform brightness and color across the entire projection plane.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)–3(F) show a second lens array 50.

FIG. 6 is a diagram showing the function of the first polarization converting element array 60a.

FIGS. 10(A)–10(F) show a first lens array 40A.

FIGS. 11(A)–11(F) show a second lens array 50A.

FIGS. 19(A)–19(C) show a second lens array 150 of the fourth embodiment.

FIGS. 21(A)–21(F) show a second lens array 150A of the fifth embodiment.

DESCRIPTION OF THE PREFERRED EMBODIMENT

Embodiments of the present invention will now be described with reference to the drawings. Also, in each of the following embodiments, unless stated otherwise, the direction of light propagation is along the z axis (the direction parallel to the optical axis), and when facing the direction of light propagation, the vertical is the y axis and the horizontal to the right is the x axis.

A. First Embodiment

Figure 1:
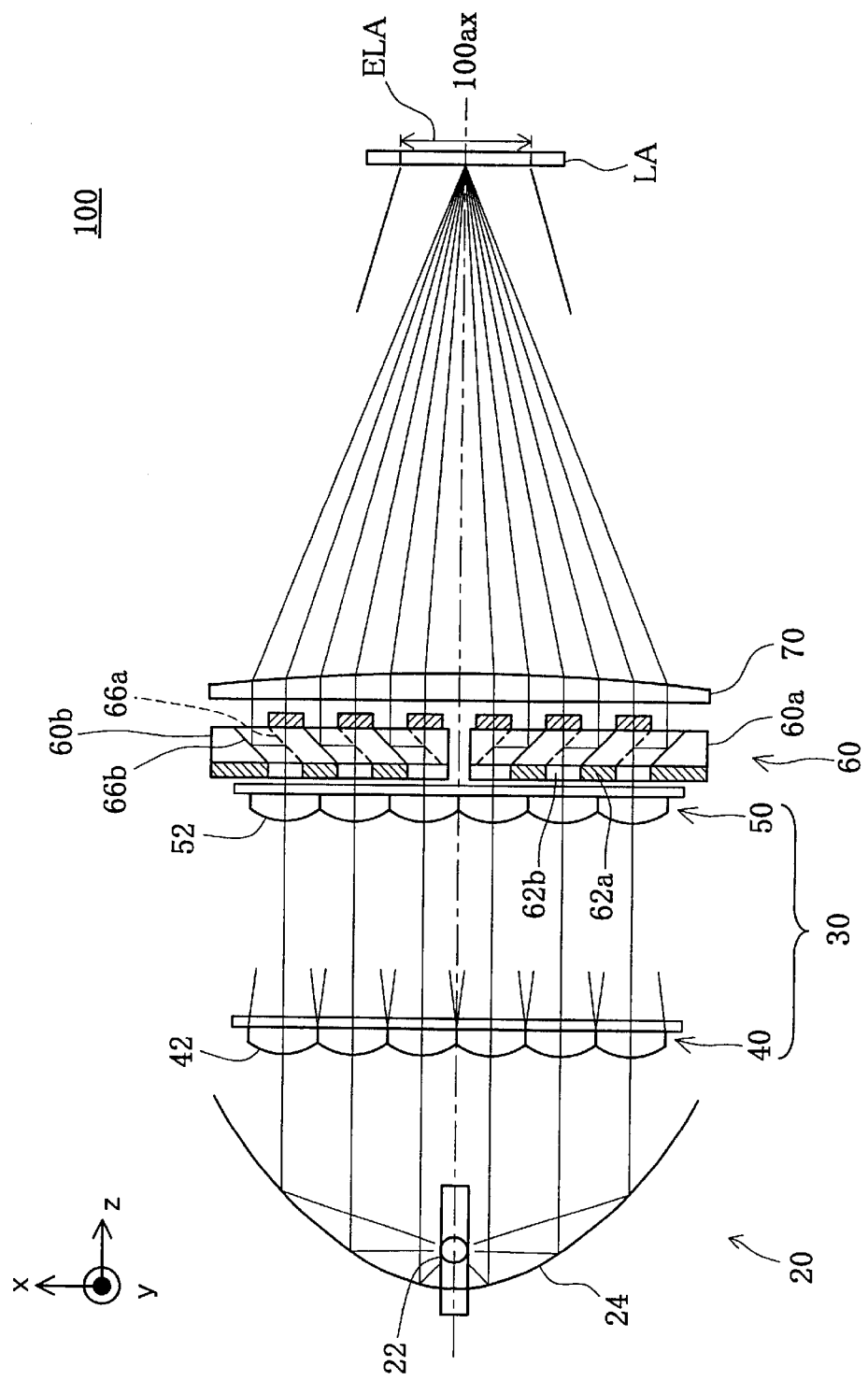
FIG. 1 is a schematic diagram showing the main parts of an illumination optical system 100 that is a first embodiment of this invention.

FIG. 1 is a schematic diagram showing the main parts of an illumination optical system 100 that is a first embodiment of this invention. The optical illumination system 100 comprises a light source 20, a beam-splitting optical system 30, a polarization conversion optical system 60 and a superimposition lens 70. These optical elements 20, 30, 60 and 70 are arranged so that their central axis coincides with a system optical axis 100ax. The beam-splitting optical system 30 and the. superimposition lens 70 form an integrator optical system for providing substantially uniform illumination of an effective illumination area ELA of the illumination area LA.

The light source 20 has a light source lamp 22 that emits radiant light, and a concave mirror 24 that reflects the light from the light source lamp 22 as a substantially parallel beam. The light source lamp 22 may be a metal halide lamp, a mercury lamp or other such high-voltage lamp. It is preferable to use a parabolic mirror as the concave mirror 24. An elliptical or spherical mirror can be used instead of a parabolic mirror.

The beam-splitting optical system 30 has a first lens array 40 and a second lens array 50. The first lens array 40 splits the light from the light source 20 into multiple light beams and converges each beam to form an image in the vicinity of the second lens array 50 and polarization conversion optical system 60.

Figure 2B:
FIGS. 2(A)–2(C) show a first lens array 40.
Figure 2A:
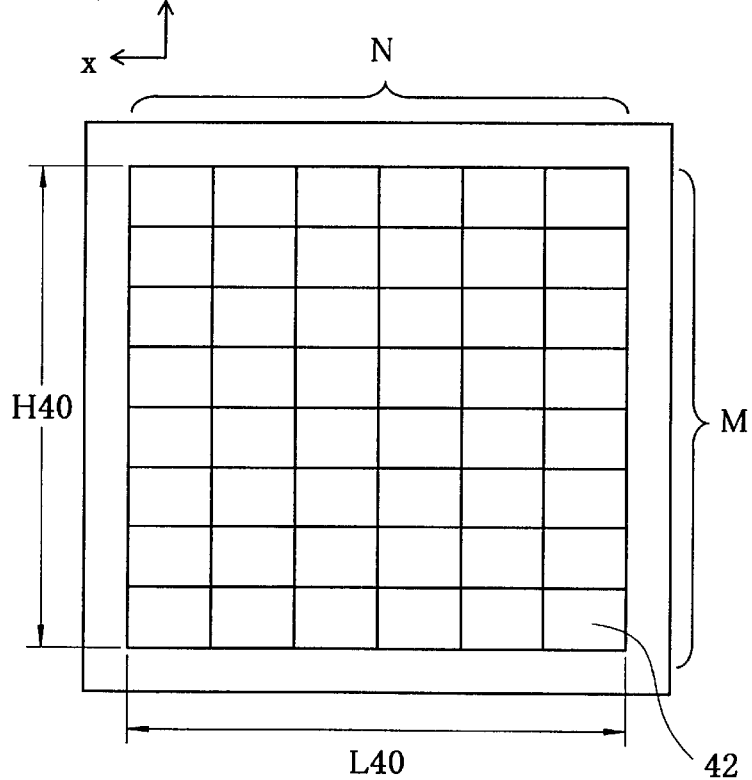
Figure 2C:

FIGS. 2(A)–2(C) show the first lens array 40. FIG. 2(A) is a front view, seen from the light incident side of the second lens array 50. FIG. 2(B) is a plan view and FIG. 2(C) a side view. The first lens array 40 is arranged as a matrix of M rows and N columns of approximately rectangular planoconvex first small lenses 42. In the example of FIG. 2, there are eight rows and six columns. The optical axis of each of the first small lenses 42 is the same as the lens's center. From now on, such lenses in which the center and optical axis coincide are referred to as concentric lenses.

The first small lenses 42, viewed looking along the z axis, are generally given a shape that approximately corresponds to the shape of the effective illumination area ELA. For example, if the illumination area is a liquid crystal panel and the aspect ratio of the area is 4:3, the first small lenses 42 is formed with the same 4:3 aspect ratio.

FIGS. 3(A)–3(F) show the second lens array 50. FIG. 3(A) is a perspective view of the second lens array 50, FIG. 3(B) is a front view, seen from the light incident side of the second lens array 50, and FIG. 3(C) is a plan view and FIG. 3(D) a bottom view. FIGS. 3(E) and 3(F) are left and right side views. The height H50 and length L50 of the second lens array 50 are approximately the same as the height H40 and length L40 of the first lens array 40. The size of a lens array refers to the collective size of the matrix of small lenses making up the array, and does not include the flat surrounding portion. The second lens array 50 comprises an approximately matrix configuration of second small lenses 52 that are the same in number as the first small lenses 42. Each of the second small lenses 52 has its own individual trapezoid shape based on its position in the matrix. The shape will be discussed later.

Figure 4:
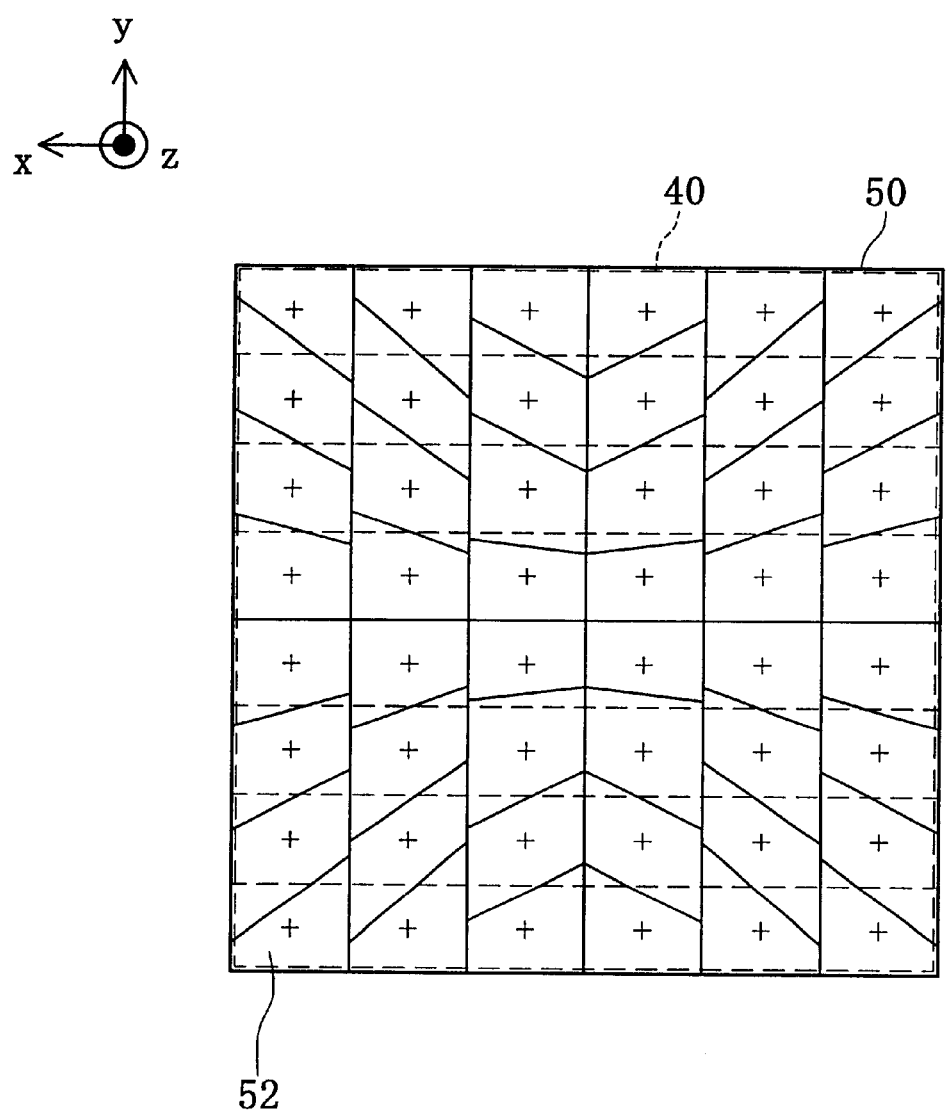
FIG. 4 is a front view of the second lens array 50 and first lens array 40, viewed from along the z axis.

FIG. 4 is a front view of the second lens array 50 and first lens array 40, viewed along the z axis, with the first lens array 40 being indicated by the dashed line. A plus sign is used to denote the optical axis of each of the first small lenses 42. The arrays are configured so that the optical axes of the second small lenses 52 coincide with the optical axes of the first small lenses 42.

The orientation of the lenses of the arrays 40 and 50 is not limited to the one shown in FIG. 1. In each case, the convex face may instead be on the exit side. Similarly, the superimposition lens 70 can be arranged with the convex face on the incident side.

The polarization conversion optical system 60 (FIG. 1) is provided with a first polarization converting element array 60a disposed at the −x side of the second lens array 50 relative to the system optical axis 100ax, and a second polarization converting element array 60b disposed at the +x side.

Figure 5:
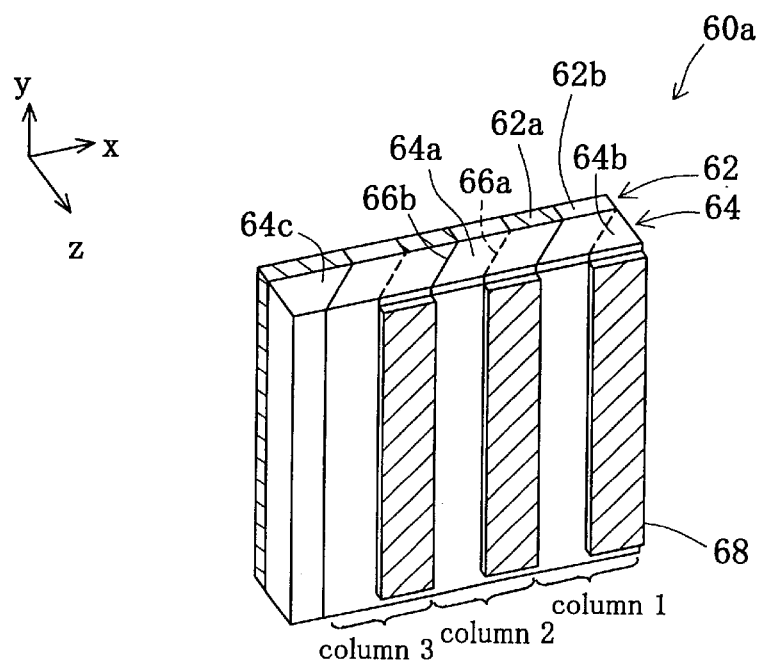
FIG. 5 is a perspective view of the configuration of a first polarization converting element array 60*a*.

FIG. 5 is a perspective view of the configuration of the first polarization converting element array 60a. The array 60a includes a light shield plate 62, a polarization beam splitter array 64, and a λ/2 retardation plates 68 that are selectively positioned on certain portions of the light exit face of the polarization beam splitter array 64. The polarization beam splitter array 64 has a configuration obtained by adhering multiple first transparent members 64a having the shape of columns of parallelogram section, at each end of which are adhered second and third transparent members 64b and 64c having the shape of columns of trapezoidal section. The second and third transparent members 64b and 64c can be formed to have the same shape of columns of parallelogram section as the first transparent members 64a, or columns of right-angled triangular section.

Polarization splitting films 66a and reflecting films 66b are formed alternately on the interface surfaces of the transparent members 64a, 64b and 64c. The polarization beam splitter array 64 can be fabricated by adhering together multiple sheets of plate glass on which are formed the polarization splitting films 66a and reflecting films 66b to provide the alternating arrangement of the films, and then cutting the adhered glass sheets at a prescribed angle of, for example, 45 degrees. A dielectric multi-layer film can be used as the polarization splitting film 66a, and a dielectric multi-layer film or aluminum film can be used as the reflecting film 66b.

The λ/2 retardation plates 68 are selectively positioned on that part of the light exit surface of the beam splitter array 64 which receives light from the polarization splitting films 66a or reflecting films 66b. In this example, the λ/2 retardation plate 68 is located on the exit surface which receives light from the polarization splitting films 66a.

The light shield plate 62 is comprised of light shielding strips 62a and light transmission strips 62b. In this example, the shielding strips 62a are disposed on that part of the incident surface of the beam splitter array 64 which leads light to the reflecting films 66b, while the transmission strips 62b are disposed on another part of the incident surface which leads light to the polarization splitting films 66a. The portion of the light incident on the first polarization converting element array 60a that is transmitted by the transmission strips 62b impinges only on the polarization splitting film 66a. The light shield plate 62 can be made of a transparent plate, such as glass, for example, on parts of which is formed a film with light-shielding properties such as a film of chromium or aluminum, or a dielectric multi-layer film, or an aluminum plate with light-transmission openings.

Figure 6:
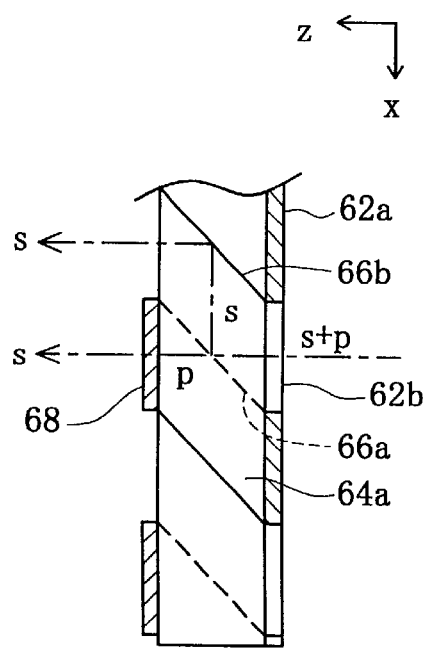

FIG. 6 is a diagram showing the function of the first polarization converting element array 60a. Unpolarized light (including s- and p-polarized light) transmitted by a light transmission strip 62b impinges on the polarization splitting film 66a of the polarization beam splitter array 64 and is divided into two types of linearly polarized light, s-polarized light and p-polarized light. Virtually all the p-polarized light is transmitted by the polarization splitting film 66a without undergoing any change. Virtually all the s-polarized light is reflected by the polarization splitting film 66a, then by the reflecting film 66b, and is transmitted without change by the polarization splitting film 66a, emerging parallel to the beam of p-polarized light. The p-polarized light transmitted by the polarization splitting film 66a is converted to s-polarized light by the λ/2 retardation plate 68. As a result, substantially all of the unpolarized light that enters the first polarization converting element array 60a is converted to s-polarized light for emission. The light could also be converted to p-polarized light by forming a λ/2 retardation plate 68 on just the part of the exit surface from which light reflected by the reflecting film 66b exits.

If the unpolarized light should impinge directly on the reflecting film 66b, light emanating from the first polarization converting element array 60a would be p-polarized light instead of s-polarized light. As described above, in this embodiment the light shield plate 62 prevents light impinging on the reflecting film 66b. This prevents unpolarized light impinging on the reflecting film 66b and being emitted by the first polarization converting element array 60a as unwanted linearly polarized light.

A block that includes a polarization splitting film 66a, an adjacent reflecting film 66b, and a λ/2 retardation plate 68 can be thought of as a column of one polarization converting element. The first polarization converting element array 60a is comprised of a plurality of such polarization converting elements arrayed in the x direction, three columns in the case of this embodiment.

As can be understood from the foregoing, the part of the incident surface of the polarization converting element arrays 60a, 60b where the light shielding strip 62a is located corresponds to the non-effective incident surface of the polarization conversion optical system 60, and the part of the incident surface of the arrays 60a, 60b where the light transmission strip 62b is located corresponds to the effective incident surface of the polarization conversion optical system 60. In this embodiment, an area which is a projection of the reflecting film 66b in the x direction corresponds to the non-effective incident surface, and another area which is a projection of the polarization splitting film 66a in the x direction corresponds to the effective incident surface.

The configuration of the second polarization converting element array 60b is symmetrical to that of the first polarization converting element array 60a, relative to the system optical axis 100ax, and has the same function, so further description thereof is omitted.

The polarization conversion optical system 60 may be provided with just one polarization converting element array instead of the two arrays 60a and 60b.

The light emitted by the light source 20 (FIG. 1) is split into multiple light beams by the first small lenses 42 of the first lens array 40. These multiple light beams are converged to impinge on the corresponding second small lenses 52 of the second lens array 50 and thereby each form a convergence image in the vicinity of the second lens array 50 and polarization conversion optical system 60. To facilitate the explanation, in FIG. 1 a solid line is used to denote the central axis of each of the multiple light beams. The second small lenses 52 of the array 50 are used to converge incident light to effectively illuminate the illumination area LA. The multiple light beams exiting the second small lenses 52 fall incident on the polarization splitting film 66a. As explained in the foregoing, light incident on the polarization conversion optical system 60 is converted almost entirely to one type of linearly polarized light. The multiple light beams from the polarization conversion optical system 60 are superimposed on the effective illumination area ELA by the superimposition lens 70. Thus, the effective illumination area ELA is evenly illuminated by virtually one type of linearly polarized light.

The second lens array 50, polarization conversion optical system 60 and superimposition lens 70 are positioned slightly apart. However, it is preferable to bond them together with adhesive to reduce light loss across the interfaces. The superimposition lens 70 can be omitted.

The second lens array 50 and the polarization splitting film 66a are much closer together than the first lens array 40 and the second lens array 50, so the multiple light beams incident on the polarization conversion optical system 60 can be considered to be the same size as the convergence images formed by the beams.

The illumination optical system 100 is characterized by the shape of the second small lenses 52(FIG. 3), as described below.

B. Convergence Images in the Vicinity of the Second Lens Array and Lens Shape

Figure 7:
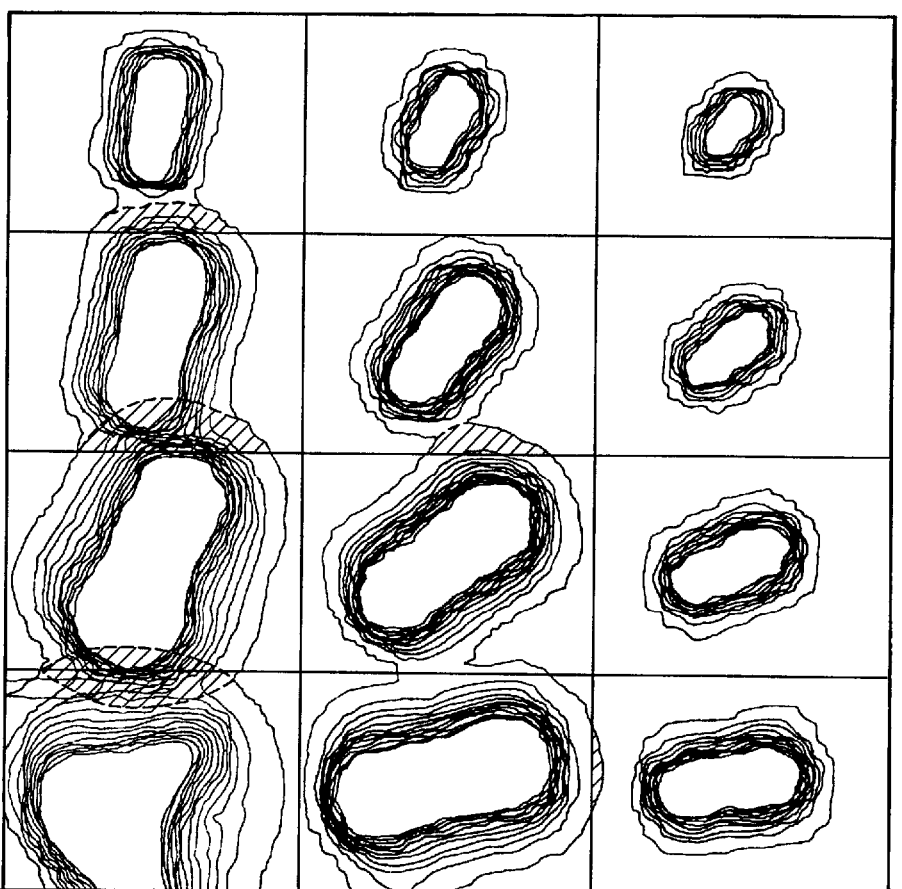
FIG. 7 is a diagram showing convergence images formed in the vicinity of the second lens array 50 by the first lens array 40.

FIG. 7 is a diagram showing convergence images formed in the vicinity of the second lens array 50 by the first lens array 40. Contour lines are used to show the images in terms of light intensity. FIG. 7 only shows the convergence images on the upper right portion of the second lens array 50. Light emitted by the light source 20 exhibits symmetry about the optical axis 100ax, so the convergence images on the left half are symmetrical with those on the right half, and there is also a vertical symmetry between the images in the upper and lower halves.

Since the light source lamp 22 is not a point light source, the shape of the convergence images produced by the multiple light beams is influenced by the shape of the light source lamp. In this example, the shape is one that is elongated in the direction of a line joining the system optical axis 100ax with the position of convergence image formation (radiant direction). The parallelism of the light emitted by the light source 20 tends to improve as the distance from the system optical axis 100ax increases, so the more peripheral a convergence image is, the smaller it tends to be. The rectangles in FIG. 7 represent shapes of small lenses of a hypothetical second lens array when the second lens array were formed using the same small lenses 42 as those of the first lens array 40. In this case, convergence images formed by the multiple beams overflow onto adjacent small lenses. In FIG. 7, hatching is used to indicate overflow portions. The first and second lens arrays 40 and 50 are arranged so that light transmitted by the small lenses of the arrays illuminates the effective illumination area ELA, via the superimposition lens 70. It may be impossible to properly illuminate the area ELA if light beams impinge in this way on lenses other than the intended ones. Such overlapping degrades the light utilization efficiency of the illumination optical system.

Figure 8:
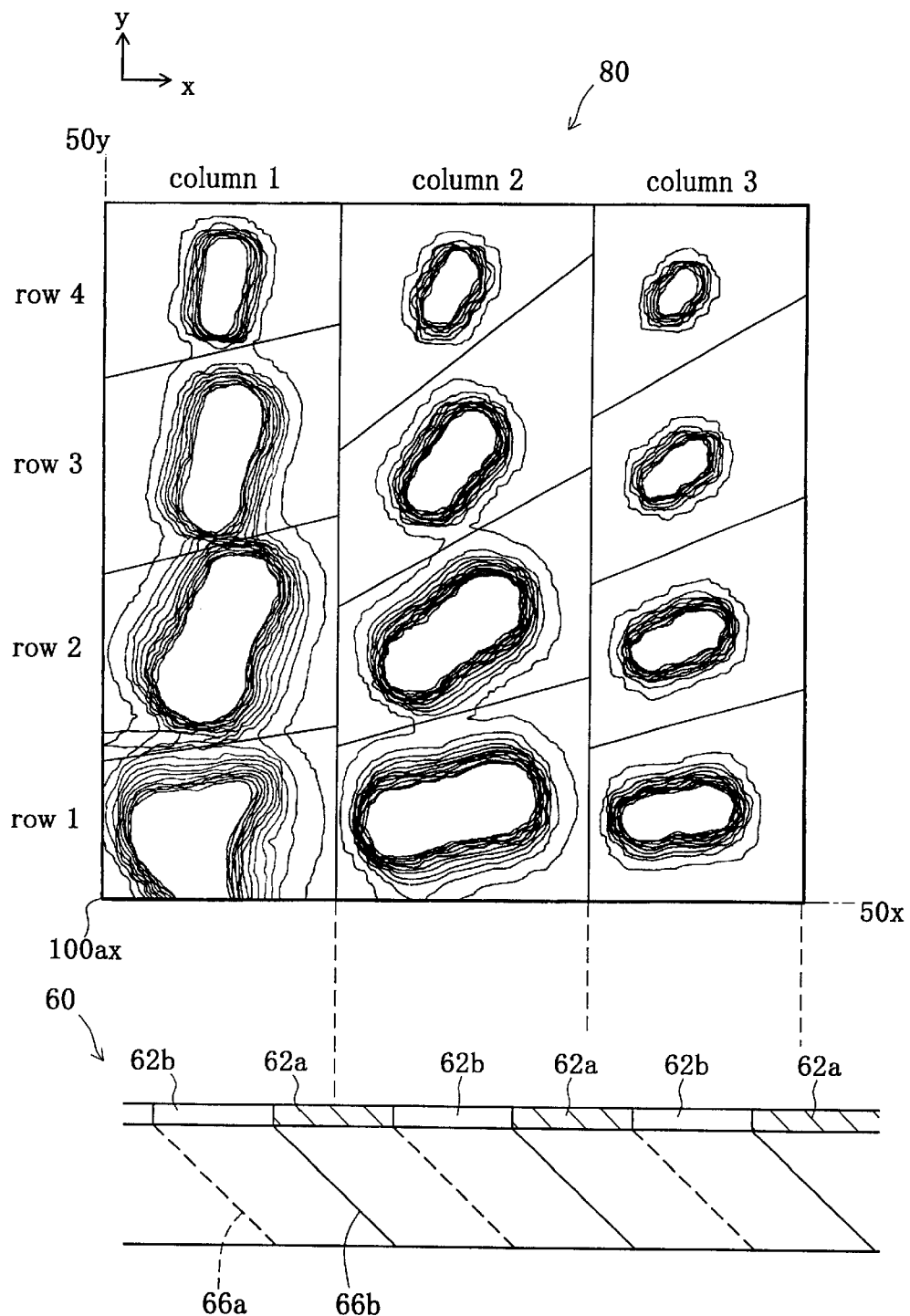
FIG. 8 is a diagram showing the relationship between the second lens array 50 and the images formed in the vicinity of the second lens array 50 by the first lens array 40.

FIG. 8 is a diagram showing the second lens array 50 in this embodiment and the convergence images formed in the vicinity of the second lens array 50. The inclination of the longitudinal axis of each convergence image relative to the x axis depends on the angle between the x axis and a line from the system optical axis 100ax to the center of the convergence image. For example, the convergence images on the bottom row in FIG. 8 are formed with the longitudinal axis oriented approximately along the x axis, while the images in the first column on the left are formed with the longitudinal axis approximately along y axis. The images in the second through forth rows of the second and third columns are formed with the longitudinal axes at an angle corresponding to the position of the images. To ensure efficient segmentation of convergence images, the second small lenses 52 of the second lens array 50 are each given an individual trapezoidal shape that is based on the position of the lens and corresponds to the orientation of the longitudinal axis of the convergence images formed by the individual light beams. The segmentation of the second small lenses 52 will now be described in more specific detail.

The second lens array 50 is divided into columns by straight lines parallel to the y axis. The invention is not limited to the use of straight lines, and the lines do not have to be parallel to the y axis. However, for the reasons described below, it is preferable to use straight lines parallel to the y axis.

For reference, the polarization conversion optical system 60 is shown at the bottom of FIG. 8. There are a light shielding strip 62a and a light transmission strip 62b for each column of the second lens array 50. An arrangement is used whereby the multiple beams from the second lens array 50 fall incident on the light transmission strips 62b. There is a light transmission strip 62b on each side of a light shielding strip 62a, so it is desirable that the x-axis location of each of the lines dividing the array into columns be within the width of a light shielding strip 62a. Dividing the second lens array 50 into columns by using straight lines parallel to the y axis facilitates the segmentation of the columns.

The second lens array 50 is divided into rows, each at a different angle of inclination (relative to the x axis) that is related to the orientation of the longitudinal axis of the convergence images. The further away a convergence image is from the system optical axis 100ax, the greater the angle of the longitudinal axis, and therefore the higher the angle of the lines used to segment the row. As the longitudinal axes of the convergence images in the column nearest to the system optical axis 100ax are approximately in alignment with the y axis, the segmenting lines each have a correspondingly smaller angle.

The second lens array 50 can also be regarded as being segmented as follows. If a reference line (axis) 50x is set parallel to the x axis and another reference line (axis) 50y is set parallel to the y axis, the angle, relative to the reference lines 50x and 50y, of the lines used to segment the second small lenses, other than those of the first row along line 50x and the first column along line 50y, is increased with the increase in distance from the reference lines 50x and 50y.

Configuring the second lens array 50 as described makes it possible to suppress overflow of convergence images from the small lenses concerned. This improves the efficiency of the illumination optical system, compared to a configuration in which the second lens array is comprised of small lenses of the same shape as the small lenses of the first lens array.

Although this embodiment has been described with reference to the second lens array 50 being configured using trapezoidal second small lenses 52, this is not limitative, as the lenses can be other shapes such as triangular, pentagonal and diamond-shaped. Similarly, the light emitted by the light source does not have to be symmetrical about a center formed by the system optical axis 100ax, but can be asymmetrical. What is necessary is to use a configuration in which the second lens array is comprised of small lenses that are polygonal but not rectangular or square, to provide a correspondence with the size, angle and other such attributes of the individual convergence images. This also applies to the other embodiments described below.

Although this embodiment was described with reference to a configuration that includes a polarization conversion optical system 60, it can be omitted from this and other embodiments.

C. Second Embodiment

Figure 9:
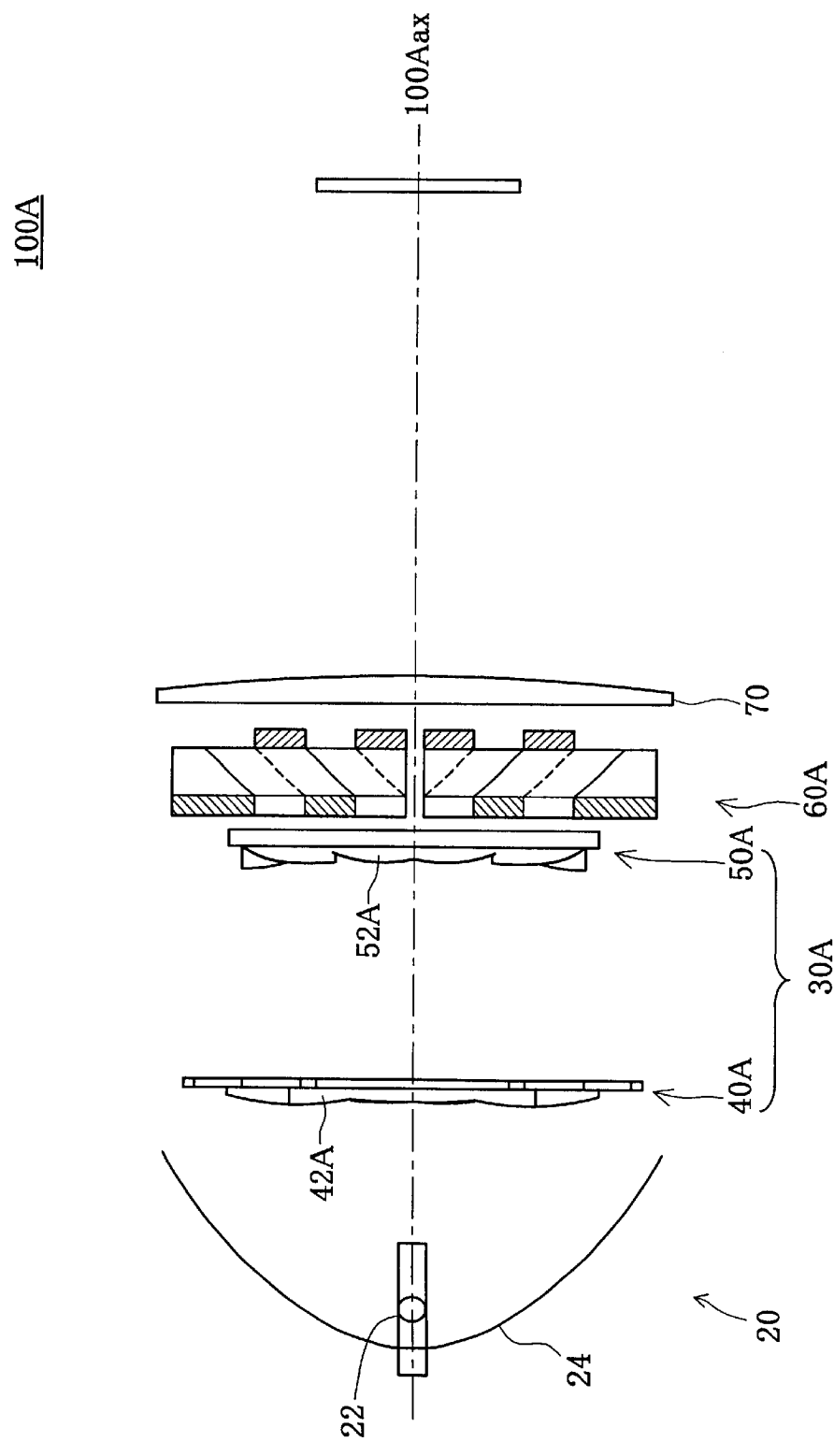
FIG. 9 is a schematic diagram showing the main parts of an illumination optical system 100A that is a second embodiment of the invention.

FIG. 9 is a schematic diagram showing the main parts of an illumination optical system 100A that is a second embodiment of the invention. Except for the beam-splitting optical system 30A and polarization conversion optical system 60A, the illumination optical system 100A has the same elements and configuration as the first embodiment.

The beam-splitting optical system 30A of this second embodiment has a first lens array 40A and a second lens array 50A.

FIGS. 10(A)–10(F) show the first lens array 40A. FIG. 10(A) is a perspective view of the first lens array 40A, FIG. 10(B) is a front view, shown from the incident side, FIG.

10(C) is a plan view and FIG. 10(D) a bottom view. FIGS. 10(E) and (F) are left and right side views. The first lens array 40A is arranged as a matrix of multiple rows and columns of approximately rectangular plano-convex first small lenses 42A. The columns do not have to all have the same number of lenses.

Here, 40Ay denotes a reference line that passes through central axis 40Aax in the direction of the y axis, and 40Ax denotes a reference line that passes through the central axis 40Aax in the direction of the x axis. Three columns are arrayed on each side of the reference line 40Ay. The first and second columns on the right each comprise eight first small lenses 42A arrayed vertically with the reference line 40Ax at the center. The third column on the right has seven small lenses 42A, each straddling two rows of the second column. The left side has the same arrangement. The following explanation may sometimes omit mention of the right or left side, but applies to both sides.

The center dots and + and x symbols in FIG. 10(B) are used to indicate the position of the optical axis of the first small lenses 42A in the first, second and third columns, respectively. The position differs from lens to lens, and depends on where the lens is located.

FIGS. 11(A)–11(F) show the second lens array 50A. FIG. 11(A) is a perspective view of the second lens array 50A, FIG. 11(B) is a front view, shown from the incident side, FIG. 11(C) is a plan view and FIG. 11(D) a bottom view. FIGS. 11(E) and (F) are left and right side views.

The second lens array 50A is comprised of multiple rows and columns of small lenses 52A, each of which has an individual shape that depends on its location. For each of the small lenses 42A of the first lens array 40A, there is a corresponding small lens 52A. In the case of the second lens array 50A, the small lenses corresponding to the small lenses in the second and third columns of the first lens array 40A are arrayed in just one column, the second column. The height H50A and length L50A of the second lens array 50A are approximately the same as the height H40A and length L40A of the first lens array 40A. 50Ay denotes a reference line that passes through central axis 50Aax in the direction of the y axis, and 50Ax denotes a reference line that passes through the central axis 50Aax in the direction of the x axis.

The center dots and + and x symbols in FIG. 11(B) are used to indicate the position of the optical axis of the small lenses 52A. The center dots are used for this in the first column; in the second column the + sign is used to show the position of the optical axis in the odd-numbered small lenses 52A, counting from the top; and in the third column the x sign is used to show the position of the optical axis in the even-numbered small lenses 52A, again counting from the top.

The polarization conversion optical system 60A (FIG. 9) has a polarization converting element array in which the number of columns of polarization converting elements corresponds to the number of columns in the second lens array 50A. The array of polarization converting elements is arranged symmetrically with respect to the system optical axis 100Aax. The polarization converting element array used in this embodiment has one column less than the polarization converting element array 60a (FIG. 5) in the first embodiment.

Figure 12A:
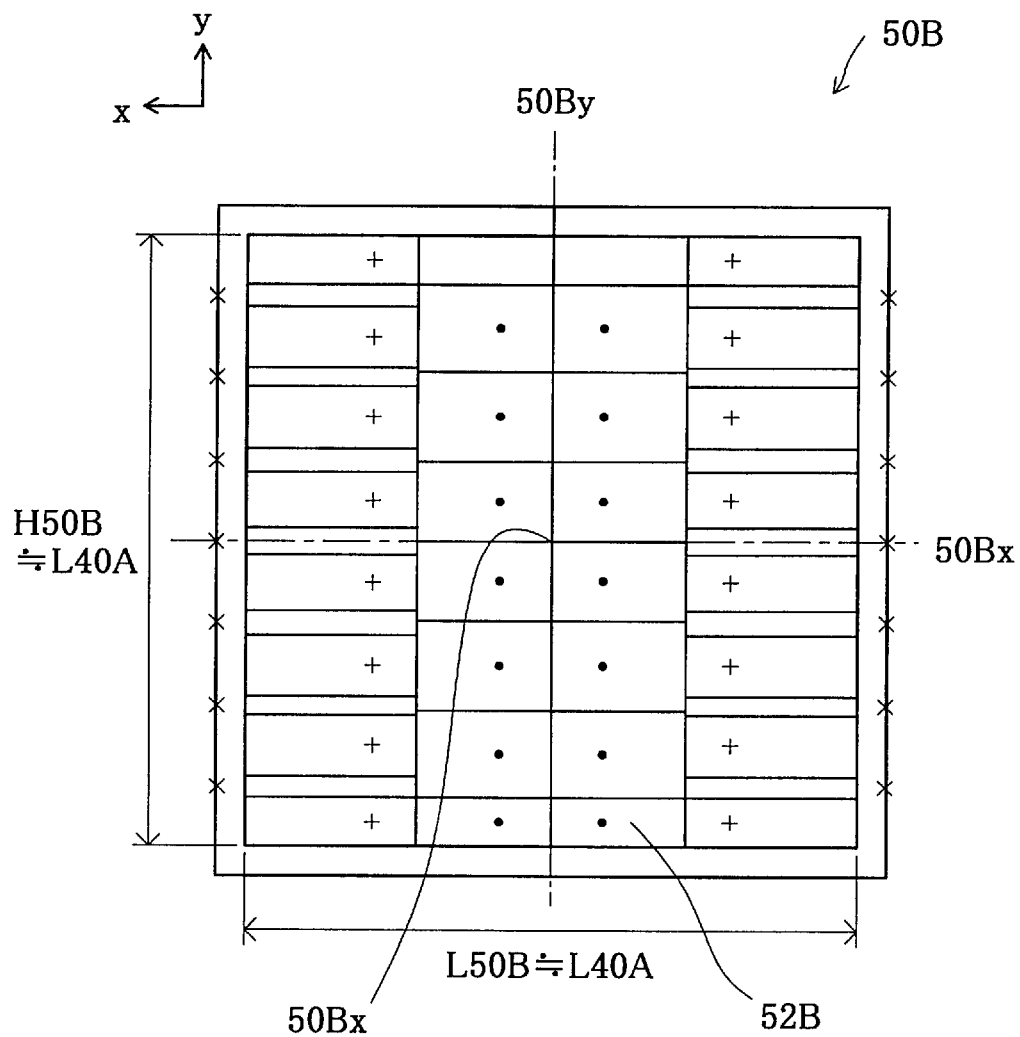
FIGS. 12(A)–12(B) show a notional second lens array 50B.
Figure 12B:
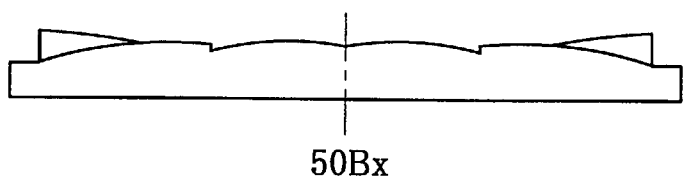

To make it easier to explain the second lens array 50A, a hypothetical second lens array 50B shown in FIGS. 12(A) and 12(B) will be explained first. FIG. 12(A) is a front view, seen from the light incident side of the hypothetical second lens array 50B. FIG. 12(B) is a bottom view.

The second lens array 50B is configured as a matrix of multiple rows and columns of approximately rectangular plano-convex small lenses 52B. For the required correspondence with the first lens array 40A, the second lens array 50B has the same number of small lenses as the first lens array 40A. However, as explained below, in the case of the second lens array 50B, the small lenses corresponding to the small lenses in the second and third columns of the first lens array 40A are all in just one column, the second. The height H50B and length L50B of the second lens array 50B are approximately the same as the height H40A and length L40A of the first lens array 40A. 50By denotes a reference line that passes through central axis 50Bax in the direction of the y axis, and 50Bx denotes a reference line that passes through the central axis 50Bax in the direction of the x axis.

There are two columns of small lenses 52B on each side of the reference line 50By. The first column on the right has the same number of small lenses as the first column on the right in the first lens array 40A. This means there are four rows of second small lenses 52B above the reference line 50Bx and four rows below. The second column on the right has 15 small lenses 52B, which is the same as the sum total of the first small lenses 42A in the second and third columns on the right in the first lens array 40A. In the second column, the odd-numbered small lenses 52B correspond to the small lenses 42A in the second column of the first lens array 40A, and the even-numbered small lenses 52B correspond to the small lenses 42A in the third column.

The columns are set to have the same length along the y axis. However, the second small lenses 52B all have different length along the y axis according to their location.

The center dots and the + and x symbols in FIG. 12(A) are used to indicate the position of the optical axis of each of the first small lenses 52B. The center dots are used to show this in the first column; in the second column the + sign is used to show the position of the optical axis in the odd-numbered small lenses 52B, counting from the top; and in the third column the x sign is used to show the position of the optical axis in the even-numbered small lenses 52B, again counting from the top. As in the case of the first small lenses 42A, the position of the optical axis of each small lens 52B is set according to the position of the lens in the matrix. The reason for this is explained below.

Figure 13:
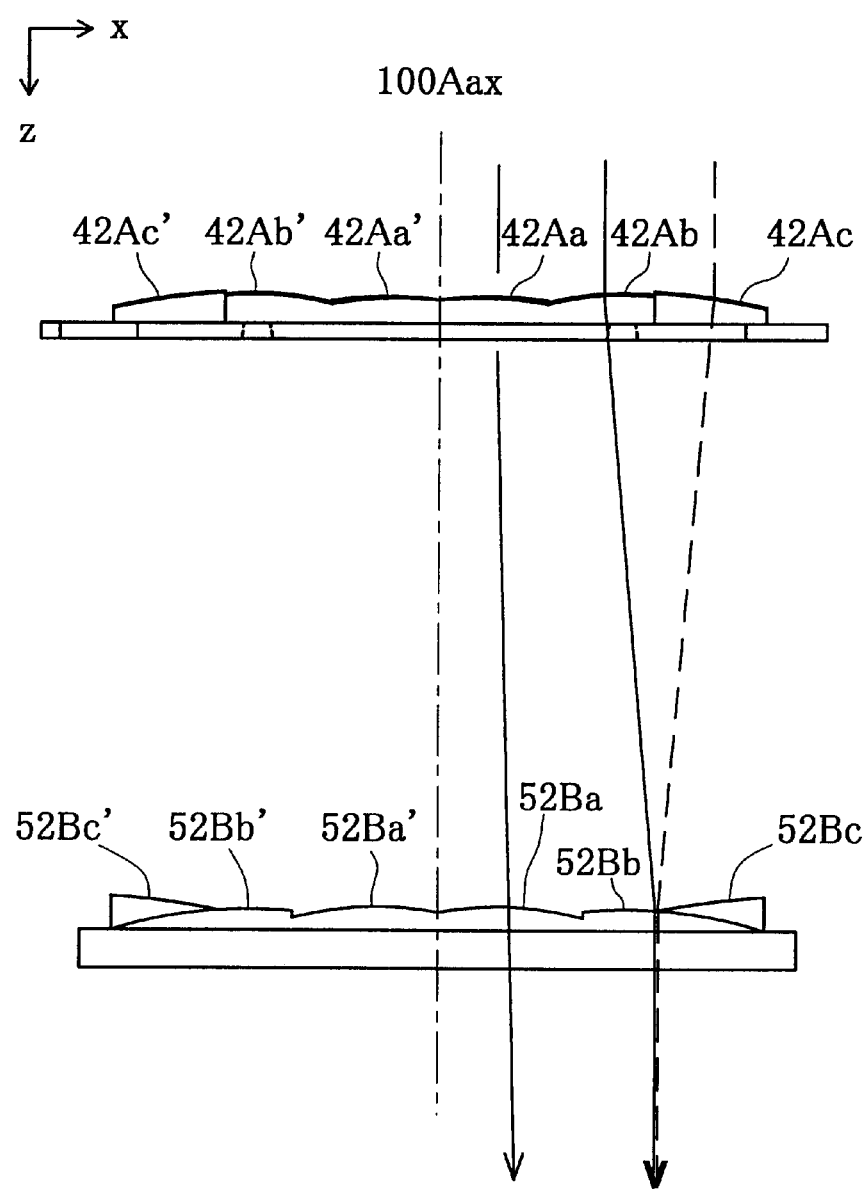
FIG. 13 is a plan diagram showing the relationship between the first lens array 40A and the second lens array 50B.

FIG. 13 is a plan diagram showing the positional relationship between the first lens array 40A and the second lens array 50B. Although this explanation is made with reference to the −x direction, it also applies to the +x direction, since the configuration of both sides is symmetrical with respect to the system optical axis 100Aax.

Although the second lens array 50B is substantially the same size as the first lens array 40A, it has one less column than the first lens array 40A, as shown in FIGS. 10(A)–10(F) and 12(A)–12(B). The individual second small lenses 52Ba to 52Bc are therefore wider than the individual first small lenses 42Aa to 42Ac. The optical axis of the small lenses 42Aa–42Ac of the first to third columns of the first lens array 40A is individually positioned to ensure that the light beams from the first lens array 40A impinge on the corresponding small lenses 52Ba–52Bc of the second lens array 50B. Similarly, the position of the optical axis in the lenses 52Ba–52Bc is also individually set ensure the alignment with the incident light beams from the associated lenses 42Aa–42Ac. In the foregoing it has also been explained that the small lenses 52Bb corresponding to the second column of the first lens array 40A and the small lenses 52Bc corresponding to the third column are arranged in one column of the second lens array 50B. More specifically, the small lenses 52Bc and 52Bb are disposed in an alternating arrangement.

The multiple light beams emanating from the first small lenses 42Aa–42Ac are each directed in accordance with the position of the lens concerned, toward the associated second small lenses 52Ba–52Bc of the second lens array 50A, where they are refracted to be substantially parallel to the system optical axis 100Aax.

Figure 14:
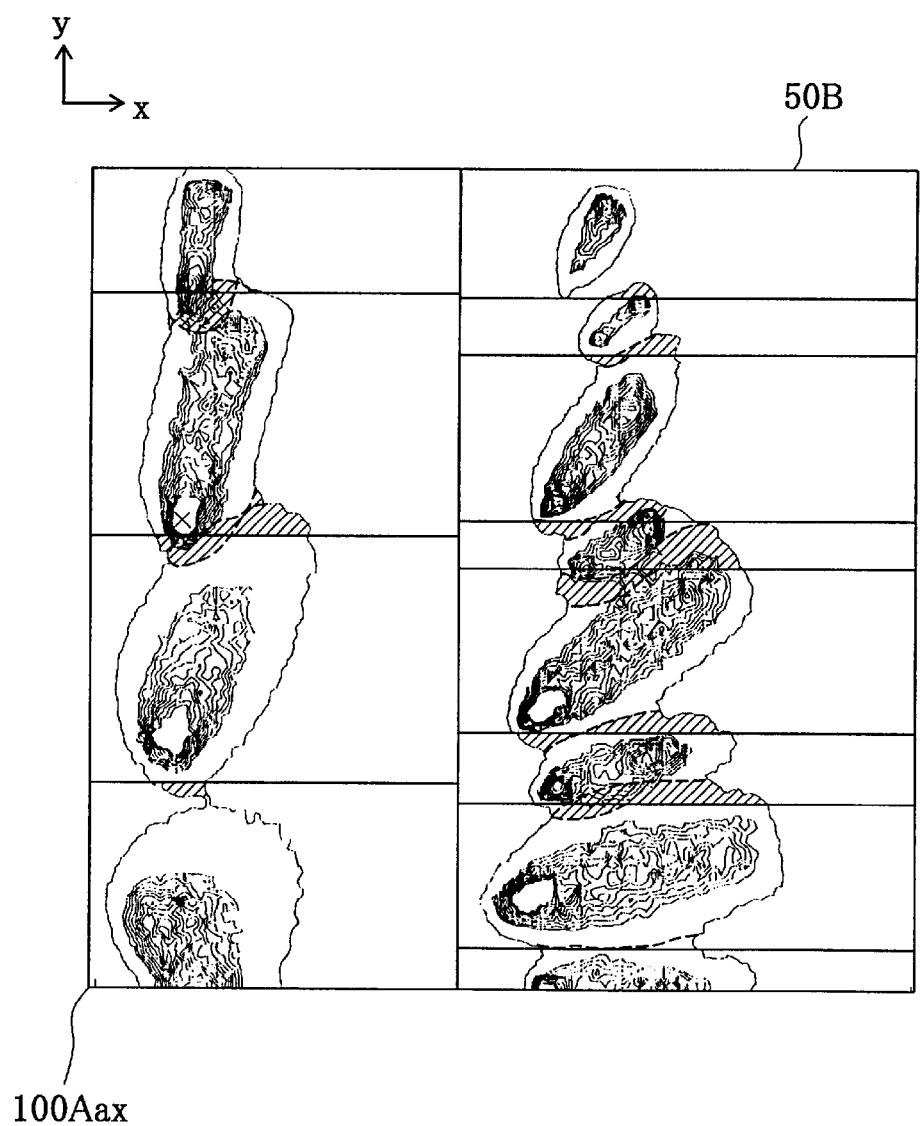
FIG. 14 is a diagram showing images formed in the vicinity of the second lens array 50B by the first lens array 40A.

FIG. 14 is a diagram showing images formed in the vicinity of the hypothetical second lens array 50B by the first lens array 40A. Only the convergence images on the upper right portion are shown.

As shown in FIG. 14, the convergence images formed in the vicinity of the second lens array 50B are formed in two columns, allowing more separation compared to when the images are formed in three columns within the same width. This has the following advantages.

As described with reference to FIGS. 5 and 6, the polarization conversion optical system is configured using polarization converting elements that include adjacent polarization splitting films 66a and reflecting films 66b, with the number of polarization converting elements used corresponding to the number of columns of the second lens array. Light impinging on the polarization splitting film 66a is converted to substantially one type of linearly polarized light. Therefore, the higher the incident efficiency of the light on the polarization splitting film 66a, the better the light utilization efficiency.

If a beam-splitting optical system 30B is comprised of the first lens array 40A and second lens array 50B, the spacing between columns of convergence images can be increased, which enables the column width of the polarization converting elements to be increased. This means that the width of the polarization splitting film 66a in the polarization converting elements can also be increased, improving the incident efficiency at which light from the second lens array 50B enters the polarization conversion optical system 60A. As a result, the light utilization efficiency of the illumination optical system is improved.

The size of the second lens array and polarization conversion optical system can be reduced by separating the columns of convergence images by the same distance used when there is no reduction in the number of columns. This makes it possible to reduce the angle of incidence of light impinging on downstream optical elements. Since a lower angle of incidence raises the light utilization efficiency of such elements, the light utilization efficiency of the illumination optical system is also improved.

Figure 15:
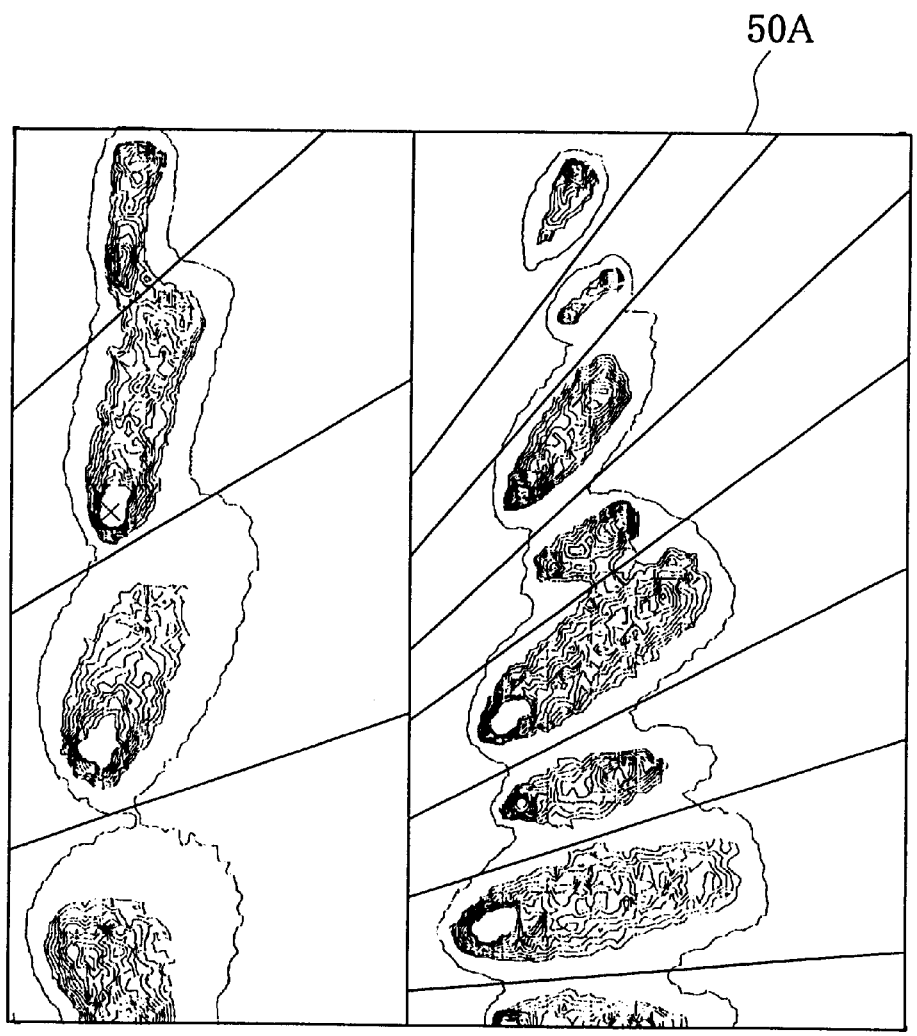
FIG. 15 is a diagram showing the relationship between the second lens array 50A and the images formed in the vicinity of the second lens array 50A by the first lens array 40.

The second lens array 50A of the second embodiment was achieved by adding the feature of the second lens array 50 of the first embodiment to the hypothetical second lens array 50B. As shown in FIG. 14, images formed in the vicinity of the second lens array 50B exhibit some overflow to adjacent small lenses. To reduce this overflow, as shown in FIG. 15, the second lens array 50A is comprised of polygonal small lenses 52A, providing a segmentation corresponding to the shape of the images formed by the multiple light beams. By thus making it possible to reduce such image overflow, the result is greater improvement in the light utilization efficiency compared to that obtained using the hypothetical second lens array 50B.

In accordance with the illumination optical system 100A of this embodiment, of the multiple beams formed by the first lens array 40A, convergence images formed by the two columns at the left end and the two columns at the right end are each formed in one column. However, the invention is not limited to this configuration. For example, images formed by three or more columns of multiple light beams could be arrayed in one column. Nor does the images of two columns at each of the left and right ends have to be consolidated into one column. The images from just one side could instead be consolidated into a single column. Similarly, the columns involved do not have to be the two endmost ones. Three columns may be consolidated into two. In short, any arrangement may be used whereby multiple columns of light beams formed by multiple columns of small lenses in the first lens array are projected into fewer columns in the second lens array. The above variations are also applicable to the third and other embodiments described below.

D. Third Embodiment

Figure 16:
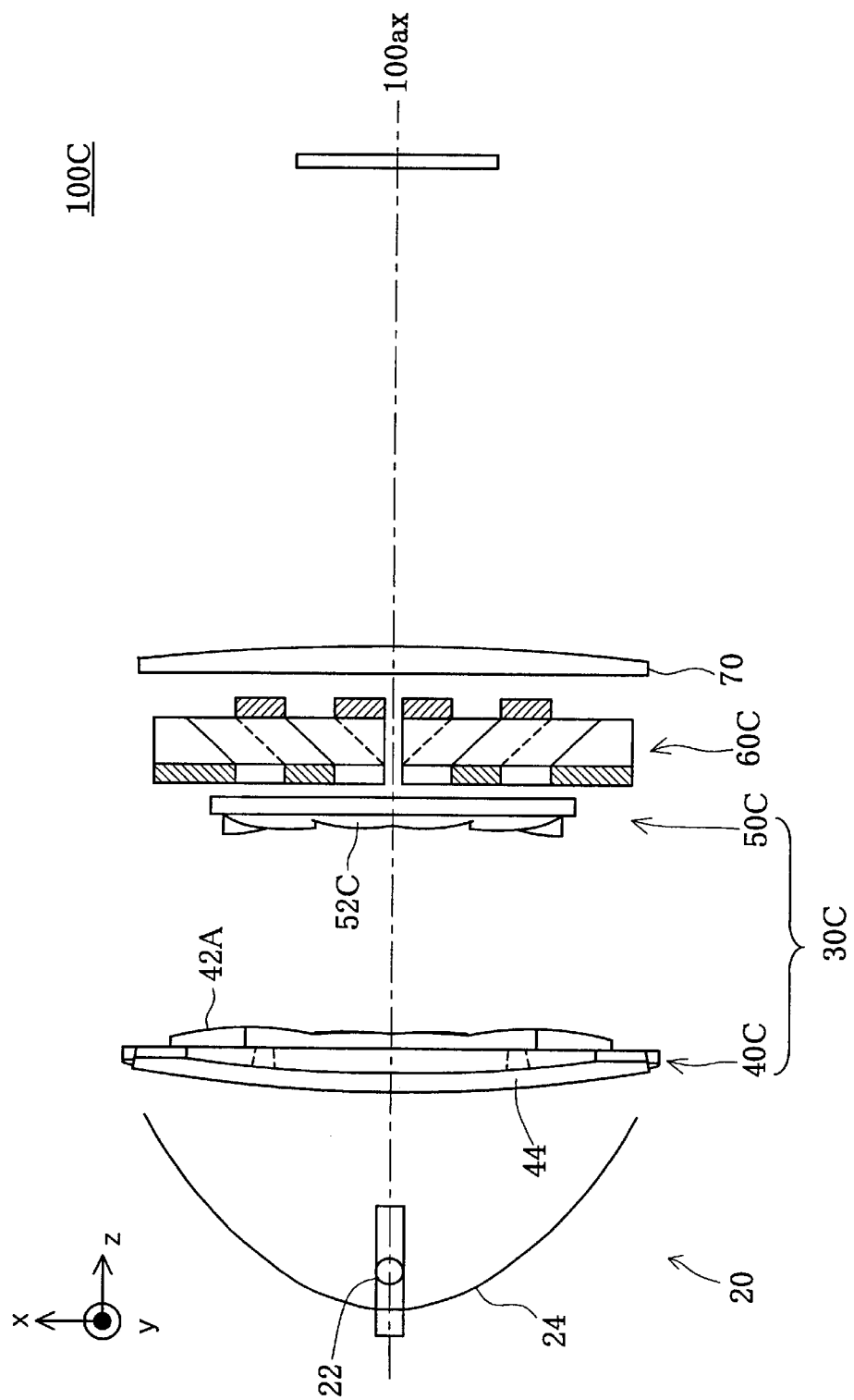
FIG. 16 is a schematic diagram showing the main parts of an illumination optical system 100C that is a third embodiment of the invention.

FIG. 16 is a schematic diagram showing the main parts of an illumination optical system 100C that is a third embodiment of the invention. Except for the beam-splitting optical system 30C and polarization conversion optical system 60C, the illumination optical system 100C has the same elements and configuration as the second embodiment.

The beam-splitting optical system 30C of this second embodiment is equipped with a first lens array 40C and a second lens array 50C.

Figure 17:
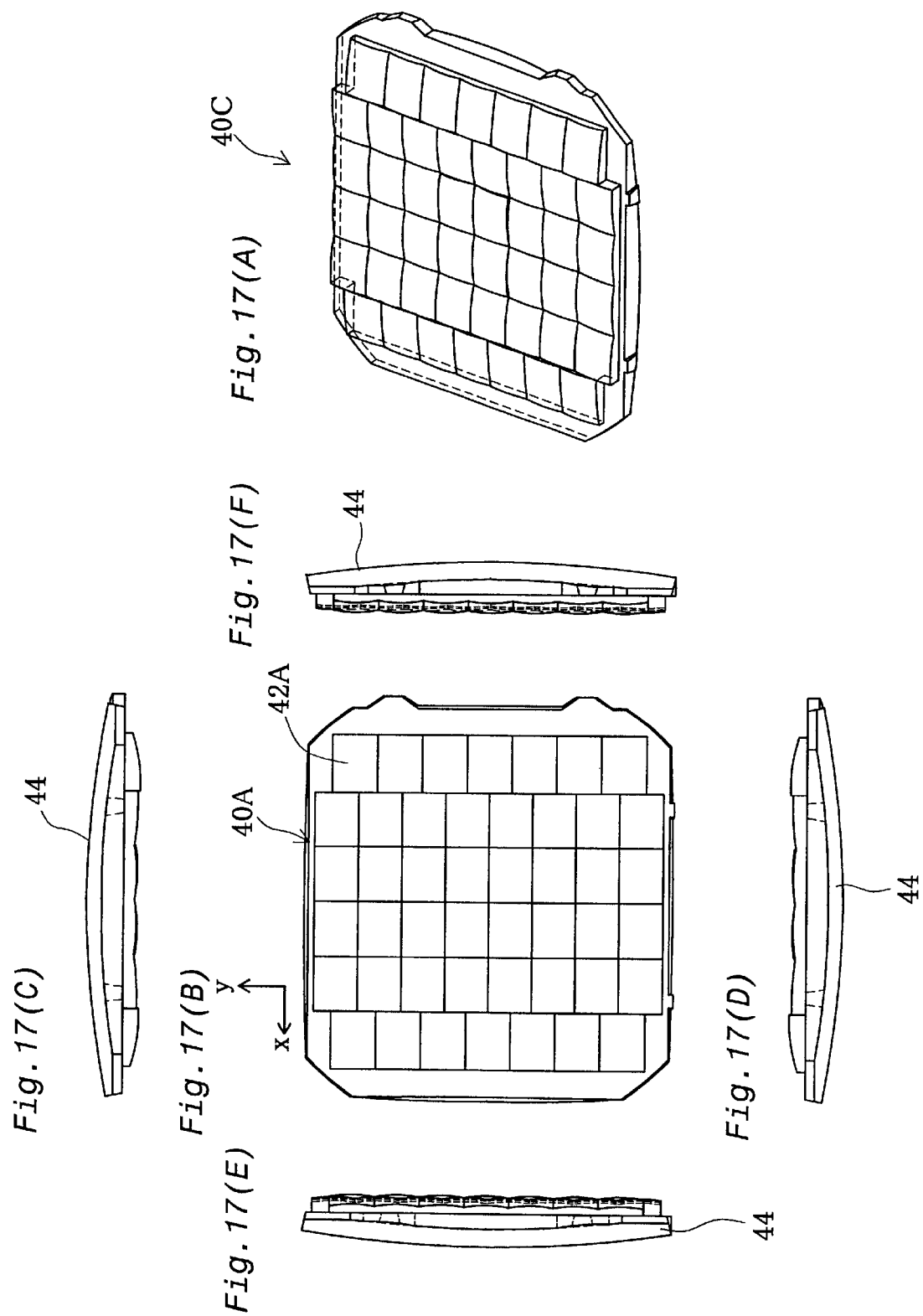
FIGS. 17(A)–17(F) show a first lens array 40C.

FIGS. 17(A)–17(F) show the first lens array 40C. FIG. 17(A) is a perspective view of the first lens array 40C, FIG. 17(B) is a front view, shown from the light incident side, FIG. 17(C) is a plan view and FIG. 17(D) a bottom view. FIGS. 17(E) and (F) are left and right side views. The first lens array 40C is provided with a plano-convex converging lens 44 on the side opposite to that on which the first small lenses 42A of the first lens array 40A are formed. The converging lens 44 is larger than the first lens array 40A.

The second lens array 50C (FIG. 16) is a scaled-down version of the second lens array 50A of the second embodiment (FIG. 11) to match the size of the light beam converged by the lens 44. As well as having the functionality of the second small lenses 52A of the second lens array 50A, the second small lenses 52C are also configured to make the light converged by the lens 44 parallel to the system optical axis 100ax.

Figure 18:
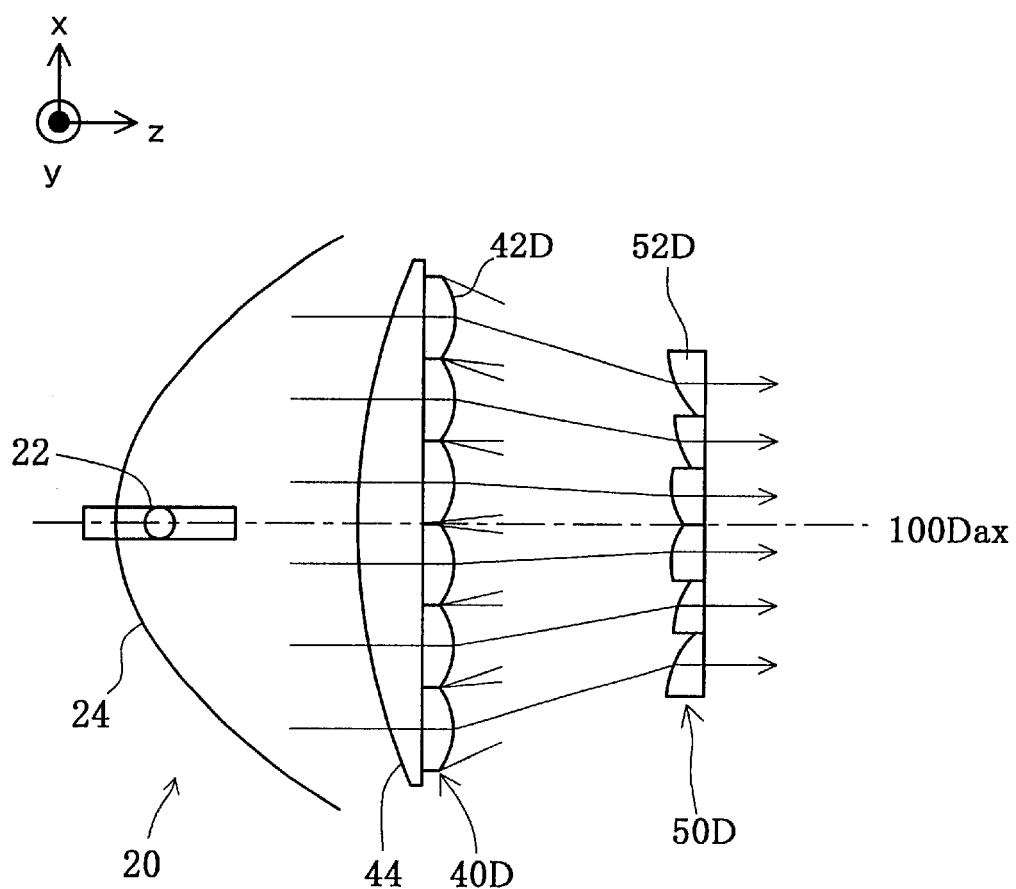
FIG. 18 is a diagram showing the function of a converging lens 44 of the first lens array 40C.

FIG. 18 is a diagram showing the function of the converging lens 44 of the first lens array 40C. The drawing shows the light source 20, converging lens 44, hypothetical first and second lens arrays 40D, 50D. The first small lenses 42D constituting the first lens array 40D are concentric lenses. The second small lenses 52D used for the second lens array 50D are smaller than the first small lenses 42D. The position of the optical axis of each of the second small lenses 52D differs depending on the position of the lens in the array matrix.

Substantially parallel light emitted by the light source 20 is converged by the converging lens 44 and split into multiple beams by the first small lenses 42D. The multiple beams emanating from the first small lenses 42D are directed toward the system optical axis 100Dax to fall incident on the associated small lenses 52D of the second lens array 50D. The second small lenses 52D refract the beams to be parallel to the system optical axis 100Dax. In this way, the width of the collective light beam exiting the second lens array 50D is made smaller than the width of the beam incident on the converging lens 44. Thus, the converging lens 44 and second lens array 50D function as an afocal system that converts the light rays incident on the converging lens 44 into a narrower set of beams.

The fact that the overall width of the light emitted by the afocal optical system is smaller means that the angle of light incidence on downstream optical elements can be reduced, compared to when an afocal system is not used. As has been explained with reference to the second embodiment, a smaller angle of incidence means a better light utilization efficiency in the optical element concerned. This means that the light utilization efficiency can be improved by using an afocal system.

The second lens array 50C (FIG. 16) has the function of the hypothetical lens array 50D, shown in FIG. 18, to return the converged light to a parallel state as well as the function of the second lens array 50B in the second embodiment described before. The converging lens 44 of the third embodiment acts as a first element of an afocal system to converge the light, and the second lens array 50C acts as a second element of the afocal system to return the converged light to a parallel state. Thus, the configuration of the illumination optical system 100C also serves to raise the incident efficiency of light entering the polarization conversion optical system 60C. The afocal system also serves to improve the light utilization efficiency of the optical elements on the downstream side of the second lens array 50C. As a result, the light utilization efficiency can also be increased in the illumination optical system of this embodiment.

E. Fourth Embodiment

FIGS. 19(A)–19(F) show a second lens array 150 of the fourth embodiment. FIG. 19(A) is a front view, looking from the light incident side, FIG. 19(B) is a plan view and FIG. 19(C) a side view. Except for the second lens array 150, the illumination system of the fourth embodiment has the same elements and configuration as the first embodiment shown in FIG. 1. The second lens array 150 comprises an approximately matrix configuration of small lenses 152 that are the same in number as the first small lenses 42 of the first lens array 40.

Here, 150y denotes a reference line that passes through central axis 150ax in the y direction, and 150x denotes a reference line that passes through the central axis 150ax in the x direction. Three columns are arrayed on each side of the reference line 150y. The first and second columns on the right each comprise eight small lenses 152 arrayed vertically with the reference line 150x at the center. The small lenses 152 have different shapes depending on the position. The configuration is the same on the left side. The following explanation may omit mention of the right or left side, but still applies to both sides.

In contrast to the first lens array 40 (FIGS. 2(A)–2(C)) in which adjacent columns of small lenses 42 are in direct contact with each other, the columns of second small lenses 152 are separated by flat portions 154. There is no flat portion 154 between the first column on the right and the first column on the left. A flat portion 154 can be provided between these two columns.

The height H150 and length L150 of the second lens array 150 are each approximately the same as the height H40 and length L40 of the first lens array 40. The overall width is less by an amount corresponding to the flat portions 154 at the left and right outer edges.

The shape of the second small lenses 152 and the flat portion 154 will now be discussed.

Figure 20:
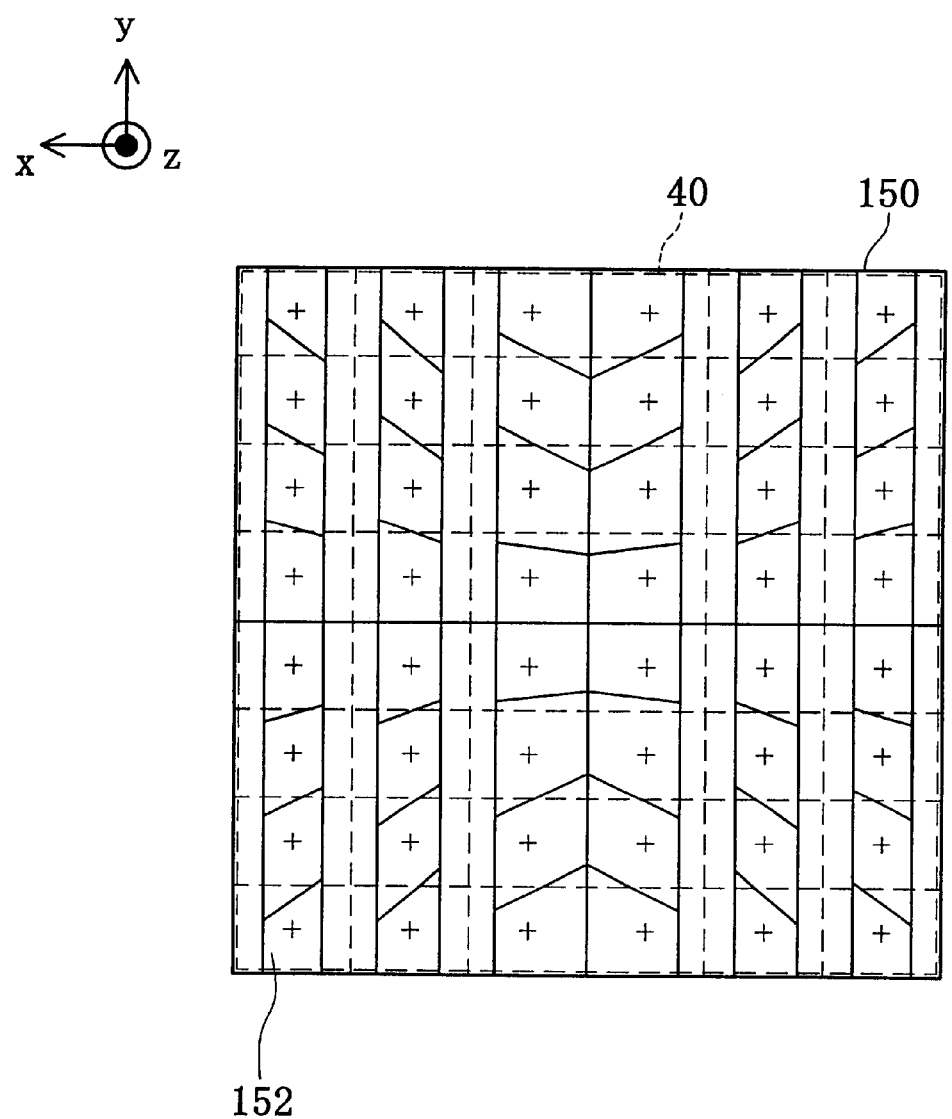
FIG. 20 is a front view of the second lens array 150 and first lens array 140, viewed from along the z axis.

FIG. 20 is a front view of the second lens array 150 and first lens array 40, viewed along the z axis, with the first lens array 40 being indicated by the dashed line. A plus sign is used to denote the optical axis of each of the first small lenses 42. The arrays are configured so that the optical axes of the second small lenses 152 coincide with the optical axes of the first small lenses 42.

In the second lens array 150 of this embodiment, the portion at the edges of each column of small lenses in the second lens array 50 of the first embodiment are changed to the flat portion 154. This change has the following advantages.

When manufacturing a lens array such as the second lens array 50 in which the small lenses are packed together, the shape of adjoining lens edges is prone to degradation. For example, curvatures may be reduced or increased, increasing or decreasing the thickness of such portions. Excessive thinness can give rise to separation between lenses. To prevent this, lens arrays are generally made slightly thicker to allow for such shrinkage. This problem is less likely to occur when a lens surface is next to a flat surface.

Thus, the second lens array 150 of the fourth embodiment is easier to manufacture than that of the first embodiment because in the direction in which the light shielding strips 62a and light transmission strips 62b are arrayed, flat portions 154 are formed between the adjacent columns of second small lenses 152.

The portions at the ends of the columns of small lenses 52 of the first embodiment correspond, in terms of position, to the light shielding strip 62a. Since the light shielding strip 62a is a non-effective incident surface, omission of the edge portion of each column the second lens array 50 corresponding to the non-effective incident surface has no effect on the overall light utilization efficiency of the illumination optical system. For this reason, the edge portion of each column of the second lens array 50 are changed to form the flat portions 154 of the second lens array 150.

It is not necessary for all of these edge portions to be changed to be flat. Instead, just some of the edge portions may be changed for this purpose. This can make it easier to manufacture the second lens array. Ideally, the flat portions will be at least 2 mm wide for convenience of manufacture.

The light shield plate 62 can be omitted if the flat portions 154 are formed with a light shielding surface. This can be done by adhering a light shielding plate on the flat portions 154, or by forming a light shielding coating on the surface. The amount of light that is transmitted by the flat portions 154 and falls incident on the light shielding strips 62a can be reduced by providing the flat portions 154 with a light diffusing surface. This would also allow the light shield plate 62 to be omitted. Emery can be used to form a diffusion surface.

As described in the foregoing, the efficiency of the illumination optical system can be improved by using the second lens array 150, and the second lens array 150 is easy to manufacture.

F. Fifth Embodiment

FIGS. 21(A)–21(B) show a second lens array 150A of the fifth embodiment. FIG. 21(A) is a perspective view of the second lens array 150A, FIG. 21(B) is a front view, shown from the incident side, FIG. 21(C) is a plan view and FIG. 21(D) a bottom view. FIGS. 21(E) and (F) are left and right side views. Except for the second lens array 150A, the illumination system of the fifth embodiment has the same elements and configuration as the second embodiment shown in FIG. 9.

Her, 150Ay denotes a reference line that passes through central axis 150Aax in the direction of the y axis, and 150Ax denotes a reference line that passes through the central axis 150Aax in the direction of the x axis. Two columns of small lenses 152A are arrayed on each side of the reference line 150Ay. The first column on the right comprises eight small lenses 152A arrayed vertically with the reference line 150Ax at the center. The second column on the right has fifteen small lenses 152A. Each column has a flat portion 154A along its outer edge. The left side has the same arrangement. There is no flat portion 154A between the first column on the right and the first column on the left. However, a flat portion 154 can also be provided between these two central columns. The following explanation may sometimes omit mention of the right or left side, but applies to both sides.

The height H150A and length L150A of the second lens array 150A are approximately the same as those of the first lens array 40A. The overall width of the second lens array 150A is smaller than the first lens array 40A by an amount corresponding to the flat portions 154A at the left and right outer edges.

The array of polarization converting elements 60A (FIG. 9) is arranged symmetrically with respect to the system optical axis 100Aax. The polarization converting element array of this embodiment has one column less than the polarization converting element array 60a shown in FIG. 1.

The portion along the outer edge of each column of small lenses in the second lens array 50A shown in FIG. 11 is change to be a flat portion in the second lens array 150A.

The second lens array 150A uses the outer edge portion of each column of small lenses of the second lens array 50A as the flat portions, and has almost the same functions as the array 50A. This improves the efficiency of the illumination optical system, compared to a configuration in which the second lens array is comprised of small lenses of the same substantially rectangular shape as the small lenses of the first lens array.

Since the edge portions of the columns of small lenses 52A are changed to be the flat portions 154, the second lens array 150A is easy to manufacture. There are also other benefits, described below.

Figure 22A:
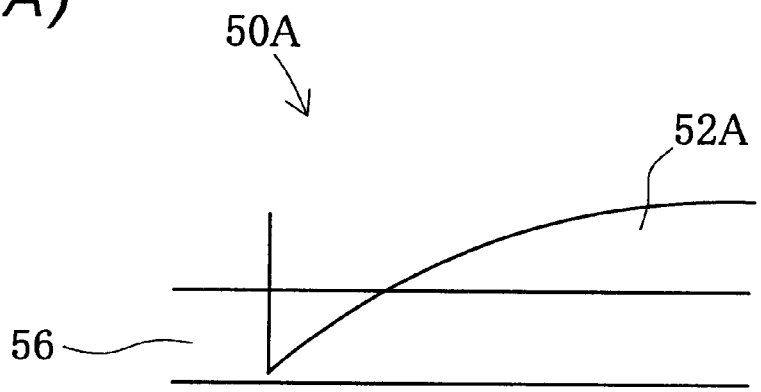
FIGS. 22(A)–22(B) show sectional views of a second small lens 52A of the second lens array 50A in the second embodiment and a second small lens 152A of the second lens array 150A in the fifth embodiment.
Figure 22B:
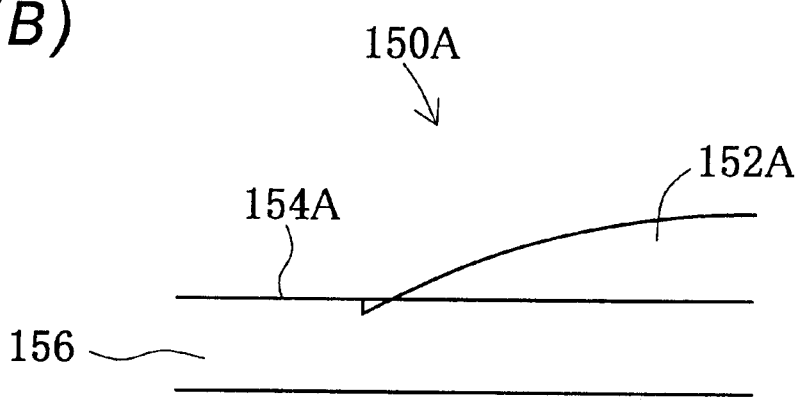

FIGS. 22(A) and 22(B) schematically show side views of the second small lens 52A located in the second row from the top of the second column of the array 50A in the second embodiment, and the second small lens 152A located in the second row from the top of the second column of the array 150A in the fifth embodiment. As can be seen, at the edge portion of the second small lenses 152A, there is formed a flat portion 154 corresponding to the edge portion of the second small lenses 52A. As a result, the degree of depression of the lens surface in the substrate 156 in the case of the array 150A can be made smaller than that of the array 50A. This enables the substrate 156 of the array 150A to be made thinner than the substrate 56 of the array 50A.

It should be noted that the afocal system of the third embodiment is also applicable to the fourth and fifth embodiments.

G. Projector

Figure 23:
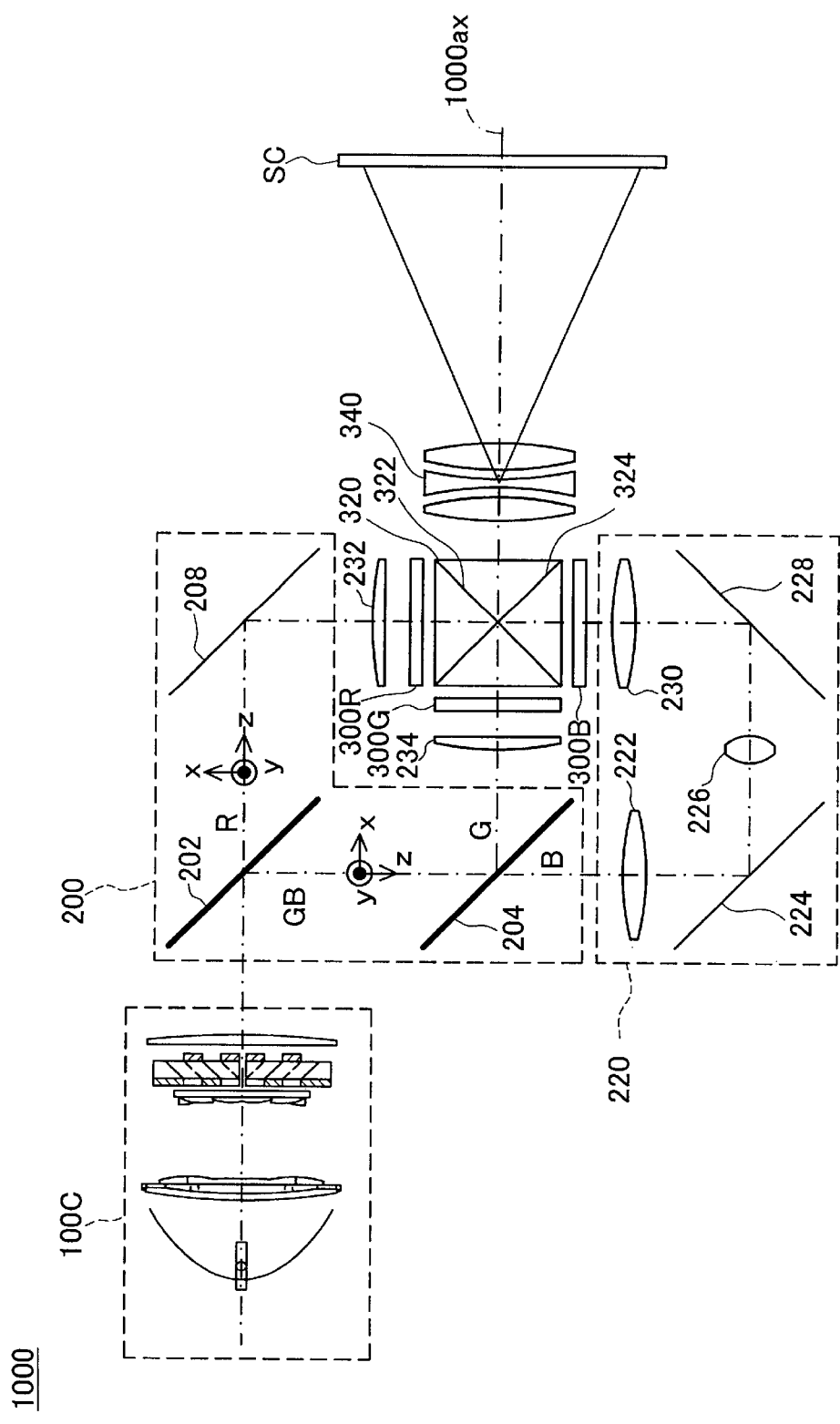
FIG. 23 is a schematic diagram showing the main parts of a projector 1000 using an illumination optical system 100C of the invention.

FIG. 23 is a schematic diagram showing the main parts of a projector 1000 using the illumination optical system 100C of the third embodiment of the present invention.

This projector 1000 includes the illumination system 100C, a color separating optical system 200, a relay optical system 220, three liquid crystal light valves 300R, 300G, 300B, a cross dichroic prism 320 and a projection optical system (projection lens) 340. Light emitted by the illumination system 100C is separated by the color separating optical system 200 into red (R), blue (B) and green (G) light. The light of each color passes through the corresponding liquid crystal light valve and is modulated in accordance with the image information. The colors are then combined by the cross dichroic prism 320, and a color image is projected on a screen SC by the projection optical system 340.

The illumination system 100C emits an illumination beam of linearly polarized light (s-polarized light, in this example) in which the polarized components have the same polarization direction, to illuminate the liquid crystal light valves 300R, 300G, 300B having the illumination area LA. The liquid crystal light valves 300R, 300G, 300B are each comprised of a liquid crystal panel and polarizing plates on the incident and exit surfaces of the liquid crystal panel. The polarizing plate at the incident surface is for enhancing the degree of polarization of the illuminating light, and is arranged so that the transmission axis of the polarizing plate is in alignment with the polarization axis of the light emitted by the illumination system 100C. If the illumination system 100C emits highly polarized light, the polarizing plates can be omitted.

The color separating optical system 200 includes dichroic mirrors 202 and 204 and a reflecting mirror 208 and separates the light from the illumination system 100C into red, blue and green light. The first dichroic mirror 202 transmits the red component of the light from the optical illumination system 100C, and reflects blue and green components. The red light transmitted by the first dichroic mirror 202 is deflected by the mirror 208 onto the cross dichroic prism 320. Red light emanating from the color separating optical system 200 passes through a field lens 232 to the red liquid crystal light valve 300R. The field lens 232 converts the multiple light beams from the optical illumination system 100C to be parallel to the central axis. Field lenses 234 and 230 provided in front of the other liquid crystal light valves perform the same function.

Of the blue and green light components reflected by the first dichroic mirror 202, green light is reflected by the second dichroic mirror 204 towards the cross dichroic prism 320. The green light component emitted by the color separating optical system 200 passes to the green liquid crystal light valve 300G via the field lens 234. The blue light component transmitted by the second dichroic mirror 204 exits the color separating optical system 200 and enters the relay optical system 220, passes through entrance lens 222, relay lens 226, reflecting mirrors 224 and 228 and exit lens (field lens) exit lens 230, and impinges on the blue liquid crystal light valve 300B. A relay optical system 220 is used for the blue light to prevent the light utilization efficiency being decreased owing to the fact that the optical path of the blue light is longer than that of the other colors. In other words, it enables the blue light to fall incident on the light valve 300B under the same conditions as the other color components. The distance from the superimposition lens 70 of the optical illumination system 100C to each of the liquid crystal light valves 300R, 300G and 300B is set to be substantially equivalent consequently.

The liquid crystal light valves 300R, 300G and 300B modulate the light of each color responsive to received image information. The cross dichroic prism 320 acts as a color combiner for combining the light of the three colors thus modulated to form a color image. The cross dichroic prism 320 comprises a red light reflecting layer 321 formed of multi-layer dielectric film stacks and a blue light reflecting layer 322, also formed of multi-layer dielectric film stacks, arranged in the form of a cross. The red-reflecting dichroic layer 321 and blue-reflecting dichroic layer 322 combine the light of the three colors to form color images for projection. Light combined by the cross dichroic prism 320 proceed in the direction of the projection optical system 340, which projects the combined light to display a color image on the screen SC. Telecentric lenses can be used for the projection optical system 340.

Because the optical illumination system 100C includes an integrator optical system with a high light utilization efficiency, the projector 1000 is able to display images with more brightness and uniformity.

While the above embodiment has been described with reference to the use of the illumination optical system 100C of the third embodiment, an illumination optical system according to any of the other embodiments described above can be used.

In the above embodiment, the illumination system is applied to a projector having three liquid crystal light valves to display color images, but it is also applicable to other types of projectors. For example, the illumination system of the present invention is applicable to a projector having a single liquid crystal light valve to displaying monochrome or color images. The illumination system of the present invention is also applicable to other apparatuses and devices other than projectors.

The projector 1000 has been described as a transmission type system that uses an illumination system of this invention. The illumination system of the invention can also be applied to a reflection type projector. A transmission type system is one in which the modulation device transmits the light, while in a reflection type system the modulation device reflects the light. Reflection type modulation device include reflecting type liquid crystal display panels, and Digital Micromirror Devices (trademark of Texas Instruments Inc.). A reflection type projector can use cross-dichroic prisms as a color separator for separating the light into red, green and blue components, and as a color combiner for recombining the modulated light of three colors.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illumination system for illuminating an illumination area, comprising:
   a light source;
   a first lens array of small lenses for dividing light from the light source into a plurality of light beams; and
   a second lens array of small lenses corresponding to the small lenses of the first lens array, the second lens array being located near where the plurality of light beams from the first lens array are converged,
   wherein each small lens of the second lens array has an outer shape of a non-rectangular polygon which is related to a profile of the light converged by a corresponding small lens of the first lens array, and
   wherein, when two reference axes perpendicular to each other are defined to pass through a center of the second lens array, at least some segmentation lines used to segment the second lens array into the plurality of small lenses have an angle of inclination to the reference axes such that the angle of the inclination increases with an increase in distance from the reference axes.

2. An illumination system according to claim 1, wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

3. An illumination system according to claim 2, wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

4. An illumination system according to claim 3, wherein the first lens array includes two columns of small lenses arranged as outer and inner columns, the small lenses of the outer column being positioned at an offset to the small lenses of the inner column in a direction along the column; and
   a column of small lenses of the second lens array corresponding to the two columns of small lenses in the first lens array is comprised by alternating first small lenses corresponding to the outer column of the first lens array with second small lenses corresponding to the inner column of the first lens array.

5. An illumination system according to claim 1, wherein the illumination system includes an afocal optical system that converts a light beam to a narrower light beam.

6. An illumination system according to claim 5, wherein the afocal optical system is constituted by a converging lens located near the first lens array and the small lenses of the second lens array, the converging lens having a first function of the afocal optical system to converge light while the small lenses of the second lens array having a second function of the afocal optical system to make the converging light into a parallel light beam.

7. A projector, comprising:
   an illumination system that emits illumination light;
   a light modulator that modulates incident light from the illumination system in accordance with image information; and
   a projection optical system that projects the modulated light,
   the illumination system comprising:
   a light source,
   a first lens array of small lenses for dividing light from the light source into a plurality of light beams, and
   a second lens array of small lenses corresponding to the small lenses of the first lens array, the second lens array being located near where the plurality of light beams from the first lens array are converged,
   wherein each small lens of the second lens array has an outer shape of a non-rectangular polygon which is related to a profile of the light converged by a corresponding small lens of the first lens array, and
   wherein, when two reference axes perpendicular to each other are defined to pass through a center of the second lens array, at least some of segmentation lines used to segment the second lens array into the plurality of small lenses have an angle of inclination to the reference axes such that the angle of the inclination increases with an increase in distance from the reference axis.

8. A projector according to claim 7, wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

9. A projector according to claim 7, wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

10. A projector according to claim 9, wherein the first lens array includes two columns of small lenses arranged as outer and inner columns, the small lenses of the outer column being positioned at an offset to the small lenses of the inner column in a direction along the column; and a column of small lenses of the second lens array corresponding to the two columns of small lenses in the first lens array is comprised by alternating first small lenses corresponding to the outer column of the first lens array with second small lenses corresponding to the inner column of the first lens array.

11. A projector according to claim 7, wherein the illumination system includes an afocal optical system that converts a light beam to a narrower light beam.

12. A projector according to claim 11, wherein the afocal optical system is constituted by a converging lens located near the first lens array and the small lenses of the second lens array, the converging lens having a first function of the afocal optical system to converge light while the small lenses of the second lens array having a second function of the afocal optical system to make the converging light into a parallel light beam.

13. A projector according to claim 7, further comprising:

a color separator that separates light emitted from the illumination system into two or more color light beams;

a plurality of said modulators that modulate the color light beams separated by the color separator; and a color combiner that combines the color light beams modulated by the plurality of modulators;

wherein the combined light combined by the color combiner is projected by the projection optical system.

14. An illumination system for illuminating an illumination area, comprising:

a light source;

a first lens array of small lenses for dividing light from the light source into a plurality of light beams; and a second lens array of small lenses corresponding to the small lenses of the first lens array, the second lens array being located near where the plurality of light beams from the first lens array are converged, the small lenses of the second lens array being arrayed in columns;

the second lens array having a flat portion provided between the columns of the small lenses.

15. An illumination system according to claim 14, wherein each small lens of the second lens array has an outer shape of a non-rectangular polygon which is related to a profile of the light converged by a corresponding small lens of the first lens array.

16. An illumination system according to claim 14, further comprising:

a polarization converter including alternating effective incident surface portions and non-effective incident surface portions, the polarization converter converting the plurality of light beams supplied from the second lens array into polarized light of a common polarization direction, wherein the flat portion of the second lens array is formed on at least part of the second lens array that would lead light to the non-effective incident surface portions of the polarization converter if the columns of the small lenses were to be closely arrayed without the flat portion.

17. An illumination system according to claim 15, wherein, when two reference axes perpendicular to each other are defined to pass through a center of the second lens array, at least some segmentation lines used to segment the second lens array into the plurality of small lenses have an angle of inclination to the reference axes such that the angle of the inclination increases with an increase in distance from the reference axes.

18. An illumination system according to claim 15, wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

19. An illumination system according to claim 14, wherein the flat portion has a light diffusing surface.

20. An illumination system according to claim 14, wherein the flat portion has a light shielding surface.

21. An illumination system according to claim 14, wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

22. An illumination system according to claim 21, wherein the first lens array includes two columns of small lenses arranged as outer and inner columns, the small lenses of the outer column being positioned at an offset to the small lenses of the inner column in a direction along the column; and a column of small lenses of the second lens array corresponding to the two columns of small lenses in the first lens array is comprised by alternating first small lenses corresponding to the outer column of the first lens array with second small lenses corresponding to the inner column of the first lens array.

23. An illumination system according to claim 14, wherein the illumination system includes an afocal optical system that converts a light beam to a narrower light beam.

24. An illumination system according to claim 23, wherein the afocal optical system is constituted by a converging lens located near the first lens array and the small lenses of the second lens array, the converging lens having a first function of the afocal optical system to converge light while the small lenses of the second lens array having a second function of the afocal optical system to make the converging light into a parallel light beam.

25. A projector, comprising:

an illumination system that emits illumination light;

a light modulator that modulates incident light from the illumination system in accordance with image information; and a projection optical system that projects the modulated light;

the illumination system comprising:

a light source;

a first lens array of small lenses for dividing light from the light source into a plurality of light beams; and a second lens array of small lenses corresponding to the small lenses of the first lens array, the second lens array being located near where the plurality of light beams from the first lens array are converged, the small lenses of the second lens array being arrayed in columns;

the second lens array having a flat portion provided between the columns of the small lenses.

26. A projector according to claim 25, wherein each small lens of the second lens array has an outer shape of a non-rectangular polygon which is related to a profile of the light converged by a corresponding small lens of the first lens array.

27. A projector according to claim 25, wherein the illumination system further comprises:
a polarization converter including alternating effective incident surface portions and non-effective incident surface portions, the polarization converter converting the plurality of light beams supplied from the second lens array into polarized light of a common polarization direction,
wherein the flat portion of the second lens array is formed on at least part of the second lens array that would lead light to the non-effective incident surface portions of the polarization converter if the columns of the small lenses were to be closely arrayed without the flat portion.

28. A projector according to claim 26, wherein, when two reference axes perpendicular to each other are defined to pass through a center of the second lens array, at least some segmentation lines used to segment the second lens array into the plurality of small lenses have an angle of inclination to the reference axes such that the angle of the inclination increases with an increase in distance from the reference axes.

29. A projector according to claim 26, wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

30. A projector according to claim 25, wherein the flat portion has a light diffusing surface.

31. A projector according to claim 25, wherein the flat portion has a light shielding surface.

32. A projector according to claim 25, wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

33. A projector according to claim 32, wherein the first lens array includes two columns of small lenses arranged as outer and inner columns, the small lenses of the outer column being positioned at an offset to the small lenses of the inner column in a direction along the column; and
a column of small lenses of the second lens array corresponding to the two columns of small lenses in the first lens array is comprised by alternating first small lenses corresponding to the outer column of the first lens array with second small lenses corresponding to the inner column of the first lens array.

34. A projector according to claim 25, wherein the illumination system includes an afocal optical system that converts a light beam to a narrower light beam.

35. A projector according to claim 34, wherein the afocal optical system is constituted by a converging lens located near the first lens array and the small lenses of the second lens array, the converging lens having a first function of the afocal optical system to converge light while the small lenses of the second lens array having a second function of the afocal optical system to make the converging light into a parallel light beam.

36. A projector according to claim 25, further comprising:
a color separator that separates light emitted from the illumination system into two or more color light beams;
a plurality of said modulators that modulate the color light beams separated by the color separator; and
a color combiner that combines the color light beams modulated by the plurality of modulators;
wherein the combined light combined by the color combiner is projected by the projection optical system.

37. An illumination system for illuminating an illumination area, comprising:
a light source;
a first lens array of small lenses configured to divide light from the light source into a plurality of light beams; and
a second lens array of small lenses corresponding to the small lenses of the first lens array, the second lens array being located near where the plurality of light beams from the first lens array are converged,
wherein each small lens of the second lens array has an outer shape of a non-rectangular polygon which is related to a profile of the light converged by a corresponding small lens of the first lens array, and
wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

38. An illumination system according to claim 37, wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

39. An illumination system according to claim 38, wherein the first lens array includes two columns of small lenses arranged as outer and inner columns, the small lenses of the outer column being positioned at an offset to the small lenses of the inner column in a direction along the column, and
wherein a column of small lenses of the second lens array corresponding to the two columns of small lenses in the first lens array comprises first small lenses corresponding to the outer column of the first lens array alternating with second small lenses corresponding to the inner column of the first lens array.

40. An illumination system for illuminating an illumination area, comprising:
a light source;
a first lens array of small lenses for dividing light from the light source into a plurality of light beams; and
a second lens array of small lenses corresponding to the small lenses of the first lens array, the second lens array being located near where the plurality of light beams from the first lens array are converged,
wherein each small lens of the second lens array has an outer shape of a non-rectangular polygon which is related to a profile of the light converged by a corresponding small lens of the first lens array, and
wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second array.

41. An illumination system according to claim 40, wherein the first lens array includes two columns of small lenses arranged as outer and inner columns, the small lenses of the outer column being positioned at an offset to the small lenses of the inner column in a direction along the column, and wherein a column of small lenses of the second lens array corresponding to the two columns of small lenses in the first lens array comprises first small lenses corresponding to the outer column of the first lens array alternating with second small lenses corresponding to the inner column of the first lens array.

42. An illumination system for illuminating an illumination area, comprising:

a light source;

a first lens array of small lenses for dividing light from the light source into a plurality of light beams; and a second lens array of small lenses corresponding to the small lenses of the first lens array, the second lens array being located near where the plurality of light beams from the first lens array are converged, wherein each small lens of the second lens array has an outer shape of a non-rectangular polygon which is related to a profile of the light converged by a corresponding small lens of the first lens array, and wherein the illumination system includes an afocal optical system that converts a light beam to a narrower light beam.

43. An illumination system according to claim 42, wherein the afocal optical system comprises a converging lens located near the first lens array and the small lenses of the second lens array, the converging lens having a first function of the afocal optical system to converge light while the small lenses of the second lens array having a second function of the afocal optical system to make the converging light into a parallel light beam.

44. A projector, comprising:

an illumination system that emits illumination light;

a light modulator that modulates incident light from the illumination system in accordance with image information; and a projection optical system that projects the modulated light, the illumination system comprising:

a light source, a first lens array of small lenses for dividing light from the light source into a plurality of light beams, and a second lens array of small lenses corresponding to the small lenses of the first lens array, the second lens array being located near where the plurality of light beams from the first lens array are converged, wherein each small lens of the second lens array has an outer shape of a non-rectangular polygon which is related to a profile of the light converged by a corresponding small lens of the first lens array, and wherein, when two reference axes perpendicular to each other are defined to pass through a center of the second lens array, at least some of the small lenses of the second lens array have an outer shape of a trapezoid defined by two segmentation lines parallel to one of the reference axes and two segmentation lines that are inclined relative to the other reference axis.

45. A projector according to claim 44, further comprising:

a color separator that separates light emitted from the illumination system into two or more color light beams;

a plurality of said modulators that modulate the color light beams separated by the color separator; and a color combiner that combines the color light beams modulated by the plurality of modulators, wherein the combined light combined by the color combiner is projected by the projection optical system.

46. A projector, comprising:

an illumination system that emits illumination light;

a light modulator that modulates incident light from the illumination system in accordance with image information; and a projection optical system that projects the modulated light, the illumination system comprising:

a light source, a first lens array of small lenses for dividing light from the light source into a plurality of light beams, and a second lens array of small lenses corresponding to the small lenses of the first lens array, the second lens array being located near where the plurality of light beams from the first lens array are converged, wherein each small lens of the second lens array has an outer shape of a non-rectangular polygon which is related to a profile of the light converged by a corresponding small lens of the first lens array, and wherein the first lens array has M columns of small lenses where M is an integer of at least 2 and the second lens array has N columns of small lenses where N is an integer of at least 1 that is smaller than M, arranged so that a plurality of light beams formed by the M columns of small lenses of the first lens array fall incident on the N columns of small lenses of the second lens array.

47. A projector according to claim 46, further comprising:

a color separator that separates light emitted from the illumination system into two or more color light beams;

a plurality of said modulators that modulate the color light beams separated by the color separator; and a color combiner that combines the color light beams modulated by the plurality of modulators, wherein the combined light combined by the color combiner is projected by the projection optical system.

48. A projector, comprising:

an illumination system that emits illumination light;

a light modulator that modulates incident light from the illumination system in accordance with image information; and a projection optical system that projects the modulated light, the illumination system comprising:

a light source, a first lens array of small lenses for dividing light from the light source into a plurality of light beams, and a second lens array of small lenses corresponding to the small lenses of the first lens array, the second lens array being located near where the plurality of light beams from the first lens array are converged, wherein each small lens of the second lens array has an outer shape of a non-rectangular polygon which is related to a profile of the light converged by a corresponding small lens of the first lens array, and wherein the illumination system includes an afocal optical system that converts a light beam to a narrower light beam.

49. A projector according to claim 48, further comprising:

a color separator that separates light emitted from the illumination system into two or more color light beams;

a plurality of said modulators that modulate the color light beams separated by the color separator; and a color combiner that combines the color light beams modulated by the plurality of modulators, wherein the combined light combined by the color combiner is projected by the projection optical system.

* * * * *